United States Patent [19]

Kozaki et al.

[11] Patent Number: 5,184,346
[45] Date of Patent: Feb. 2, 1993

[54] SWITCHING SYSTEM

[75] Inventors: Takahiko Kozaki, Koganei; Kenichi Asano, Akishima; Mineo Ogino, Hanno; Eiichi Amada, Tokyo, all of Japan; Noboru Endo, Freehold, N.J.; Yoshito Sakurai, Yokohama, Japan

[73] Assignees: Hitachi, Ltd.; Hitachi VLSI Engineering Corporation & Link Laboratory Inc., both of Tokyo, Japan

[21] Appl. No.: 526,381

[22] Filed: May 21, 1990

[30] Foreign Application Priority Data

May 31, 1989 [JP] Japan .................................. 1-136032

[51] Int. Cl.[5] ........................ H04Q 11/04; H04J 03/24
[52] U.S. Cl. ..................................... 370/60; 370/94.1; 340/525.52
[58] Field of Search ....................... 370/60, 60.1, 94.1, 370/92, 58.3; 340/825.52

[56] References Cited

U.S. PATENT DOCUMENTS 4,603,416 7/1986 Servel et al. ........................... 370/60
4,910,731 3/1990 Sakurai et al. ......................... 370/67

FOREIGN PATENT DOCUMENTS 135994 12/1982 Japan .

OTHER PUBLICATIONS

Yoshito Sakurai, et al., "A Study on an Integrated Switching Network", National Convention Record in Commemoration of the 70th Anniversary of the Foundation of The Institute of Electronics, Information and Communication Engineers of Japan, 1987, Switching Division 1832, pp. 8-91. An English translation is unavailable to applicants' attorney.

Primary Examiner—Curtis Kuntz
Assistant Examiner—T. Ghebretinsae
Attorney, Agent, or Firm—Fay, Sharpe, Beall, Fagan, Minnich & McKee

[57] ABSTRACT

A switching system exchanges communication information as fixed length cells between a plurality of incoming and outgoing highways. The fixed length cells each have a plurality of data portions with one data portion designated as a header portion for containing switching information. An address generating circuit generates read addresses and write addresses in response to the header portion of each cell and a control circuit. The plurality of cells from the incoming highways are simultaneously rotated in a rotation matrix with each of the cell's data portions rotated to a unique internal path. The data portions are then transmitted to identical write addresses in a plurality of memories via delay circuitry. The write addresses are transmitted through shift registers to the plurality of memories to allow the data portions of a single cell to occupy identical addresses within a plurality of memories. The control circuitry determines the correct outgoing highway for each cell based upon information contained within the header portion of each cell or a routing table. The data portions are then read out of read addresses in the plurality of memories and rotated by another rotation matrix. The rotated data portions reform the fixed length cell along a determined outgoing highway.

21 Claims, 11 Drawing Sheets

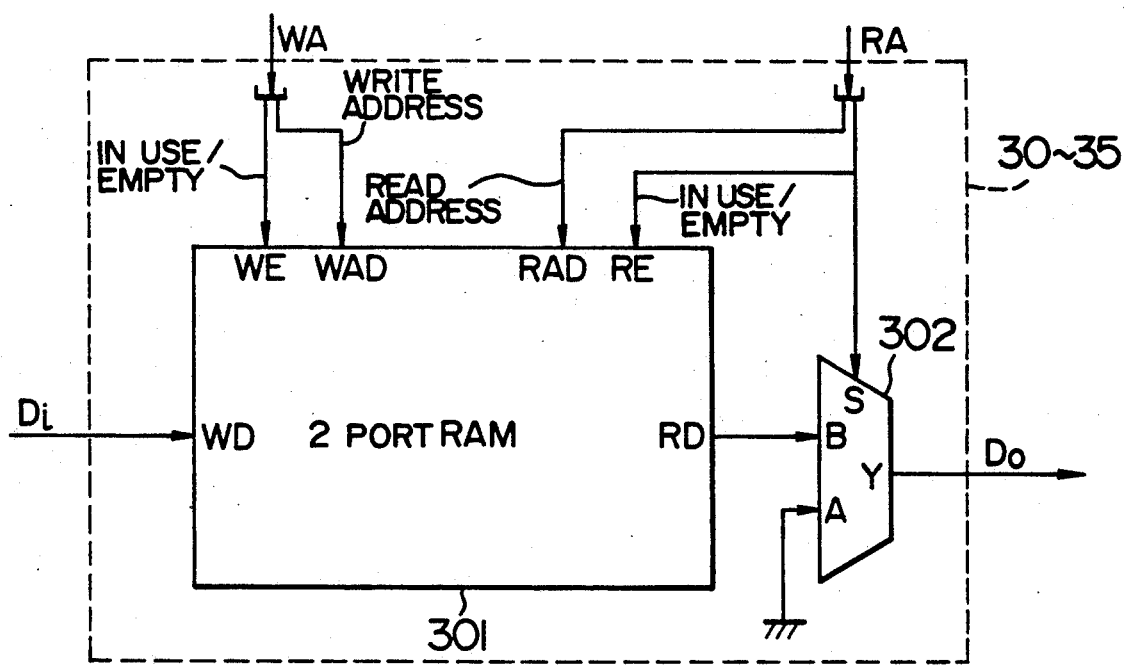
F I G. 6

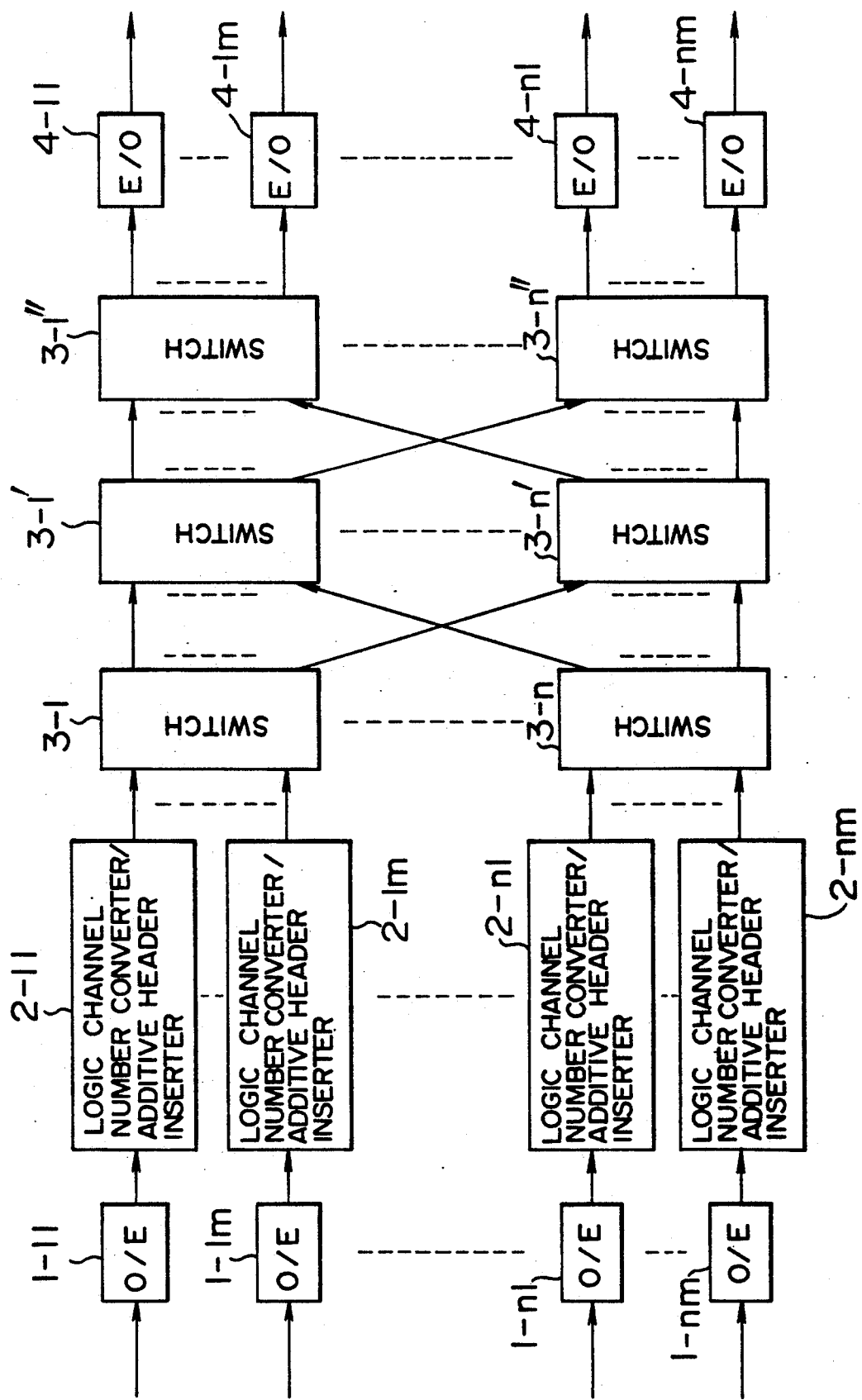

SWITCHING SYSTEM

CROSS-REFERENCE TO RELEVANT PATENT APPLICATIONS

The present application is relevant to U.S. Ser. No. 96,011 entitled "Time-division Channel Arrangement" in the name of Y. Sakurai et al, U.S. Ser. No. 218,217 filed on Jul. 13, 1988 and entitled "Switching System and Method of Construction Thereof" in the name of Y. Sakurai et al, and U.S. Ser. No. 382,419 filed on Jul. 20, 1989 and entitled "ATM Switching System" in the name of Y. Torii et al.

BACKGROUND OF THE INVENTION

The present invention generally relates to a switching system for exchanging time-division/multiplex communication information such as a sound and data employing a fixed length cell having a header for a routing. More specifically, the present invention is directed to a switching system suitable for integrating information which is originally suitable to line exchanges of sounds with information which occurs in a burst form, such as data, and for exchanging the information.

In accordance with various needs for terminal units in a network system, a flexible and economical switching system has been required that can integrate the various conditioned data communications. The communications contain not only the typical bit rate of the telephone sound (64 kb/s), but also various bit rates from low velocity data (several hundreds b/s) up to video signals (several Mb/s) and various natures, e.g., burst natures and real-time nature.

With respect to such a demand, there has been proposed, a method for uniformly switching all of information with the employment of cell having a fixed length and a header which contains information for routing. For instance, such an expectable switching method has been proposed by the Applicant in a literature entitled "A Study on an Integrated Switching Network", National Convention Record in commemoration of the 70th anniversary of the foundation of The Institute of Electronics, Information and Communication Engineers of Japan, 1987, switching division 1832. In this example, all of the communication information are transferred by employing the fixed length block referred to as a "cell". This switching system is so constructed as to employ the temporal switch function in every incoming highway in order that a plurality of cells having the same destinations collide with each other within the space-division switch with employment of the header-driver type space-division switch. Further, this temporal switch function includes the memory for the switching purpose and the buffer memory for the queuing so as to handle two modes: the line switched mode such as telephone sounds, (for requiring the real-time nature) and also the burst switched mode by which the data occurring in the burst mode is transferred with a certain amount of delay. The cell for the line switched mode is handled with a priority without processing the cell via the buffer memory in order to guarantee the real time nature, whereas the cell for the burst switched mode is processed when there is queuing in the buffer memory and an empty time slot.

Furthermore, "TDM (time-division modulation) switching system" as other conventional switching system has been described in JP-A-59-135994. In this switching system, although there is no clear description of such an idea to handle the communications containing two different natures, i.e., line switched mode and burst switched mode, another function is introduced for temporarily substituting the fixed length cell with employment of the buffer memory. In this case, the same buffer memory is utilized for the cell queuing and switching. To realize the queuing, the queue unit is employed to store the addresses of the buffer memory by which the cell is written, in accordance with the destinations of the cells.

SUMMARY OF THE INVENTION

When the switching is carried out with employment of the field length cell, the destinations of the respective cells are not always uniformly distributed. Problems may occur such that the cells sent to the same destination are temporarily concentrated, whereby confusion conditions may be induced, or the cells may disappear due to the memory overflow. In the first-mentioned publication proposed by the Applicant, there are employed buffer memories for preventing the confusion state in the respective outgoing highways of each destination. These buffer memories must store a large quantity of cells so as to avoid such an overflow, and also are required for each destination. As a result, in this switching system, a large number of memories are necessarily required. On the other hand, in accordance with the latter-mentioned conventional switching system (i.e., JP-A-59-135994), there is only one buffer memory for all inputs and a plurality of queue units for storing only the address of the buffer memory employed in each destination for the cells. In such an arrangement, a relatively small quantity of memory can compensate for the deviation in the destinations of the respective cells. However, since the write address of the buffer memory is periodically used, this equivalently implies a fixed division in the buffer memory depending upon each destination in a logical view. When the queue length exceeds over a predetermined amount, the same write address may be used and therefore the cells are newly written in the overlapped form on the same memory areas of the buffer memory even when the cells which have not yet been read remain. In this case, there is another problem that the cells originally written on the same memory areas may disappear from the buffer memory.

To solve these conventional problems, the Applicant has proposed in the above-described co-pending U.S. patent application Ser. No. 218217, the below-mentioned switching system in which a plurality of incoming highways are, processed in the time-divisional multiplexing mode. The arrived cells are written into the buffer memory, read out therefrom in a proper sequence, and then demultiplexed and distributed into a plurality of outgoing highways, whereby the switching operation is performed. In such a switching system, there are provided FIFO (First-In-First-Out) buffers (referred to as "idle address FIFOs") for storing the idle addresses of the buffer memories, and units for supervising the addresses in use, depending upon the outgoing highways. The idle address is read out from the data output of the above-described idle address FIFOs during the cell writing operation to the buffer memory, and also the addresses which have been previously read are returned to the data input of the idle address FIFOs during the cell reading operation from the buffer memory, i.e., a so-called "idle address chain" method has been proposed.

In accordance with the above-described switching system, when the cell arrives and is then written into the buffer memory, since an idle address is acquired from a single empty address FIFO irrelevant to the destination outgoing highway of this cell, the cell can be written into any region within the buffer memory until there no longer exists an empty region in the buffer memory. Even when the destinations of the arrived cells are deflectedly used for the specific outgoing highway, since it should be understood that the total amount of the cells for other destinations are reduced, the required overall capacity of the buffer memory is not changed.

Until the cell is read out, since the address at which this cell has been stored is not returned to the idle address FIFO, there is a particular advantage that the cells are not written, on this same address in the overlapped condition. Therefore no cells disappear therefrom.

However, in accordance with the above-described switching system for commonly utilizing the buffer memory among the outgoing highways in the theoretical matter, the time-divisional multiplexing for the plural incoming highways is carried out by the serial-to-parallel converting multiplexer. When the cells to read the buffer memory are multiplexing-separated so as to be distributed into a plurality of outgoing highways, the parallel-to-serial converting demultiplexer is used. A quantity of flip-flops required for arranging the serial-to-parallel converting multiplexer and also the parallel-to-serial converting demultiplexer, becomes (number of incoming highway paths)×(cell length, bit number), respectively. As a consequence, in case that there are large numbers of incoming highway paths and the cell lengths are long, the total amount of the hardware employed in this switching system becomes great.

To the contrary, in another prior art described in JP-A-59-135994, there have been proposed that the rotation matrices are employed instead by the serial-to-parallel converting multiplexer and also the parallel-to-serial converting demultiplexer in order to reduce the total amount of the hardware required in this system. In this case, the buffer memory is subdivided every bit locations of the cell data and the data on a single cell is written into each of the subdivided buffer memories at the different addresses. As a result, this conventional switching system can be hardly applied without any modification to the above-described method where the buffer memory is commonly utilized among the outgoing highways in the theoretical view.

It is therefore an object of the present invention to provide a switching system having a simple arrangement where a buffer memory is commonly employed among plural outgoing highways in a theoretical view.

To achieve such an object, in a switching system according to the present invention, it is so arranged that a switching circuit for performing a rotation connection between an incoming highway and outgoing highway, preferably a rotation matrix is utilized instead of at least one of the above-described serial-to-parallel converting multiplexer and parallel-to-serial converting demultiplexer employed in the conventional switching system. A plurality of buffer memories each storing the corresponding one unit of data to an inputted cell are provided and a shift unit for shifting the timings of application of a read address or a write address to the buffer memories by 1 unit of data of the cell respectively is provided.

That is to say, in a switching system, according to the present invention, for employing a cell of a fixed length having plural units of data, at least one unit constituting a header portion and the remaining units constituting a data portion, which is inputted to each of incoming highways, communication information is exchanged between plural incoming highways and plural outgoing highways based upon information contained in the header portion. The switching system has:

a first switching unit including a plurality of input terminals and also a plurality of output terminals, which are connected to the corresponding incoming highways, for sequentially connecting each of the input terminals for to one of the output terminals every one unit of the data on the input cell, and for continuously outputting data at one same bit position corresponding to the cell of the respective incoming highways from the respective output terminals;

a plurality of memory units for storing one corresponding output data derived from plural output terminals of the first switching circuit in response to each of write addresses, and for reading the stored data in response to each of read addresses;

an address generating circuit for outputting the write addresses and the read addresses in response to the header portion of the cell outputted from the first switching unit;

a first shift unit for applying the write addresses derived from the address generating circuit to the plurality of memory units while timings of the write address applied to the plurality of memory units are shifted by 1 unit of data of the cell respectively in such a manner that the respective data each having 1 unit on the cell appearing one incoming highway is written at the same address of the plurality of memory units;

a second switching unit including both a plurality of input terminals connected to each of corresponding outputs of the memory units, and a plurality of output terminals corresponding to the respective outgoing highways, for sequentially connecting each of the input terminals to each of the different- output terminals every data with one unit on the cell outputted from the memory units and for outputting the data of the cell on the corresponding outgoing highways to the respective output terminals; and, a second shift unit for applying the read addresses derived from the address generating circuit to said plurality of memory units while timings of application of the read address to the plurality of memory units are shifted by 1 unit of the cell respectively in such a manner that the data on the cells read out from the plurality of memory units are outputted in the second switching unit as data on cells appearing on the outgoing highways corresponding to the respective output terminals.

It should be noted that a rotation matrix employs such a circuit to perform rotary-connections of a plurality of input terminals to a plurality of output terminals in response to data of inputted cells. In other words, assuming now that the number of the output terminals are "N", the character "o" of the output terminals to be connected to the input terminals having the number of "i" is added by a variable number "n". As a result, if the number of the output terminals exceeds over the above-described number "N" of the output terminals, the output terminal number "N" is subtracted from the exceeding number. Note that the variable number "n" corresponds to a value which is updated by, for instance, 1 every one unit of data of the cell (e.g. one octet) inputted to this rotation matrix. As a consequence, the rotation matrix may be constructed of only selectors so that a total amount of hardware thereof becomes small, as compared with the above-described conventional hardware amount.

In the respective output terminals of the rotation matrix provided at the incoming highway side of the switching system, the data of the respective cells supplied from the respective incoming highways at the same bit locations are multiplexed with respect to the respective incoming highways. At this time, the data of the cell appearing on one incoming highway are outputted from the respective output terminals at different timings. Assuming now that the rotation matrix changes the connections between the input and output terminals every time the data of one unit of the cell having 1 octet, for example, is inputted thereto, the data on a single cell is outputted from the output terminals of the input-sided rotation matrix in such a way that the output timings of the respective data are shifted every 1 octet. The buffer memory is employed with respect to the octet number of a single cell in such a manner that a single cell is separated every one unit of data, e.g. 1 octet, so as to be stored therein, and the data on one cell, having 1 octet are written at the different timings shifted by 1 octet. While writing the data, one write address to the respective buffer memories is shifted by way of shift circuits, for example, shift registers by one unit of data, e.g. 1 octet, and then supplied to the respective buffer memories. As a result, all of the addresses for storing respective data of a single cell are identical to each other with respect to each of the buffer memories. As a consequence, each of the buffer memories may be commonly utilized among the respective outgoing highways.

When the data on one cell is also read from the respective buffer memories, the rotation matrix positioned at the outgoing highway side only performs the rotation connections among the input and output terminals to allow output to the outgoing highway. This is done in such a manner that while shifting the timings of the data on one cell by one unit of data, e.g. 1 octet, by employing the shift registers, the same address is applied to each of the buffer memories.

As previously described, the function of the rotation matrix is to rotation-connect the input terminals and output terminals. Since the rotation matrix may be constructed as a combinational logic circuit, the total amount of hardware required thereto is negligibly small.

Assuming now that as previously stated, the rotation matrix changes the connections between the input and output terminals every time the data having 1 octet is inputted, since the rotation matrix provided at the input side outputs each data on a single cell with a 1-octet-shifted relationship, total number of shift registers for delaying the write address amounts to a number obtained by subtracting 1 from the octet number of one cell. As a result, a total quantity of the required flip-flops is equal to (address length)×{(octet number of cell)−1}. The total amount of the hardware required for constructing the shift registers of the read addresses is equal to that for constructing the shift registers of the write addresses.

As previously described, the total quantity of flip-flops which represent the major quantity of hardware, is (number of input/output paths)×(cell length, i.e., bit number)×2 in the conventional switching system employing both the serial-to-parallel converting multiplexer and parallel-to-serial converting demultiplexer. The total amount of the hardware becomes (address length)×{(octet number of cell)−1}×2 in the switching system according to the present invention, employing the rotation matrixes and shift registers. Thus, when the cell length becomes long or the number of the input/output paths becomes great, the total amount of the hardware required in the switching system of the present invention relatively becomes small.

BRIEF DESCRIPTION OF THE DRAWINGS

FIG. 6 is a schematic block diagram of an internal circuit of the memory 30 employed in the switching system shown in FIG. 1, according to one example;

FIG. 9 represents an overall arrangement of a broad band ISDN exchanger to which the switching system according to the present invention has been applied;

DESCRIPTION OF THE PREFERRED EMBODIMENTS

Referring now to the accompanying drawings, switching systems according to embodiments of the present invention will be described.

Figure 10A:
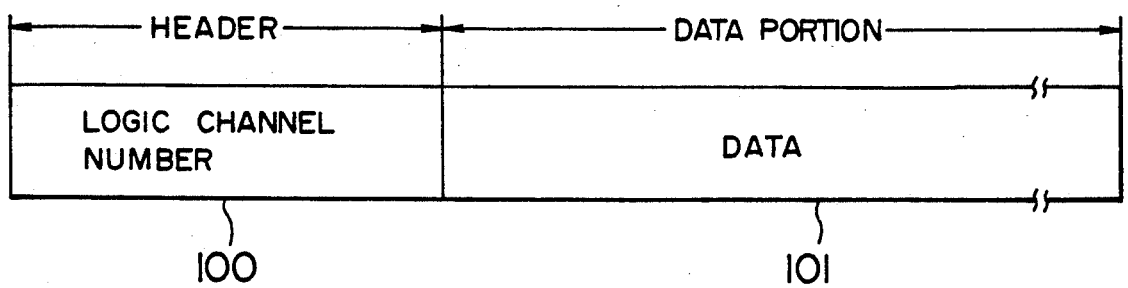
FIGS. 10A and 10B indicate formats of cells.
Figure 10B:
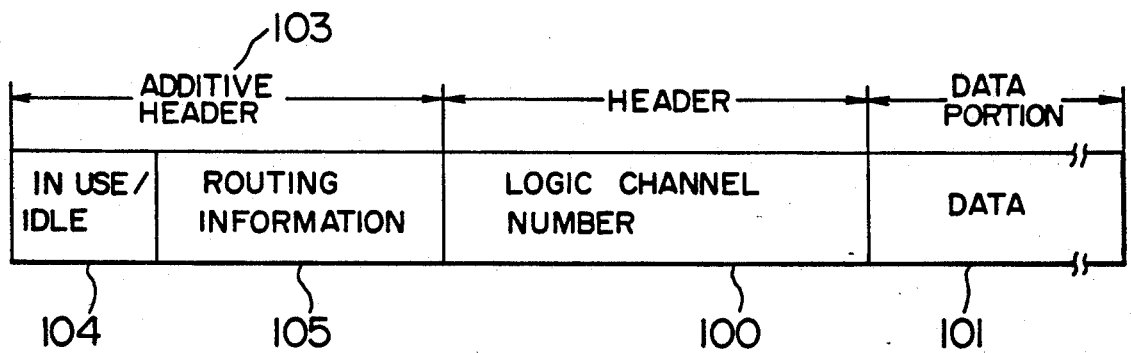

FIG. 9 is an overall arrangement of a broadband ISDN (Integrated Services Digital Network), to which a switching system according to the present invention has been applied. Cells having fixed lengths to each of n×m pieces of incoming highways are inputted via each of optical fibers to optical/electronic converters 1-11 to 1-nm so as to be converted into parallel (or serial) electronic signals. In this case, a cell format is arranged by a header having a logic channel number 100 and a data portion 101, as represented in FIG. 10A. Logic channel number converter/additive header inserters 2-11 to 2-nm corresponding to the optical/electronic converters 1-11 to 1-nm first convert logic channel numbers of the above-described input cells and secondly insert an additive header 103 to a head of the respective cells, and then output it as a cell format shown in FIG. 10B. In FIG. 10B, the additive header 103 is constructed of an effectiveness display field 104 which indicates "1" when this cell holds effective data, and indicates "0" when this cell is an idle cell (cell having no effective data), and a routing information field 105. The routing information is such an information representative of a destination of a cell (highway number of destination), and determines an output destination of a cell at switches 3-1 to 3-n''.

In the example shown in FIG. 9, since the cells which have passed through the respective inserters pass through 3-stage switches, the routing information owns 3-staged information. That is to say, a first stage switch corresponds to any one of the switches 3-1 to 3-n, a second stage switch corresponds to any one of the switches 3-1' to 3-n', and a third stage switch corresponds to any one of the switches 3-1'' to 3-n''. Accordingly, each of the switches uses corresponding one stage information of the 3-staged information. It should be noted that although a detailed description will be made to the functions of the switches 3-1 to 3-n'' with reference to FIG. 1, these switches perform a buffering operation to queuing when the cells from a plurality of inputs collide with the same outputs. The respective cells which have passed through the 3-stage switches are inputted into electrical/optical converters 4-11 to 4-nm so as to delete the additive headers in such a way that the cell format is changed from one shown in FIG. 10B into another shown in FIG. 10A, and convert the electronic signals into optical signals which will then be outputted to the optical fiber.

Figure 1:
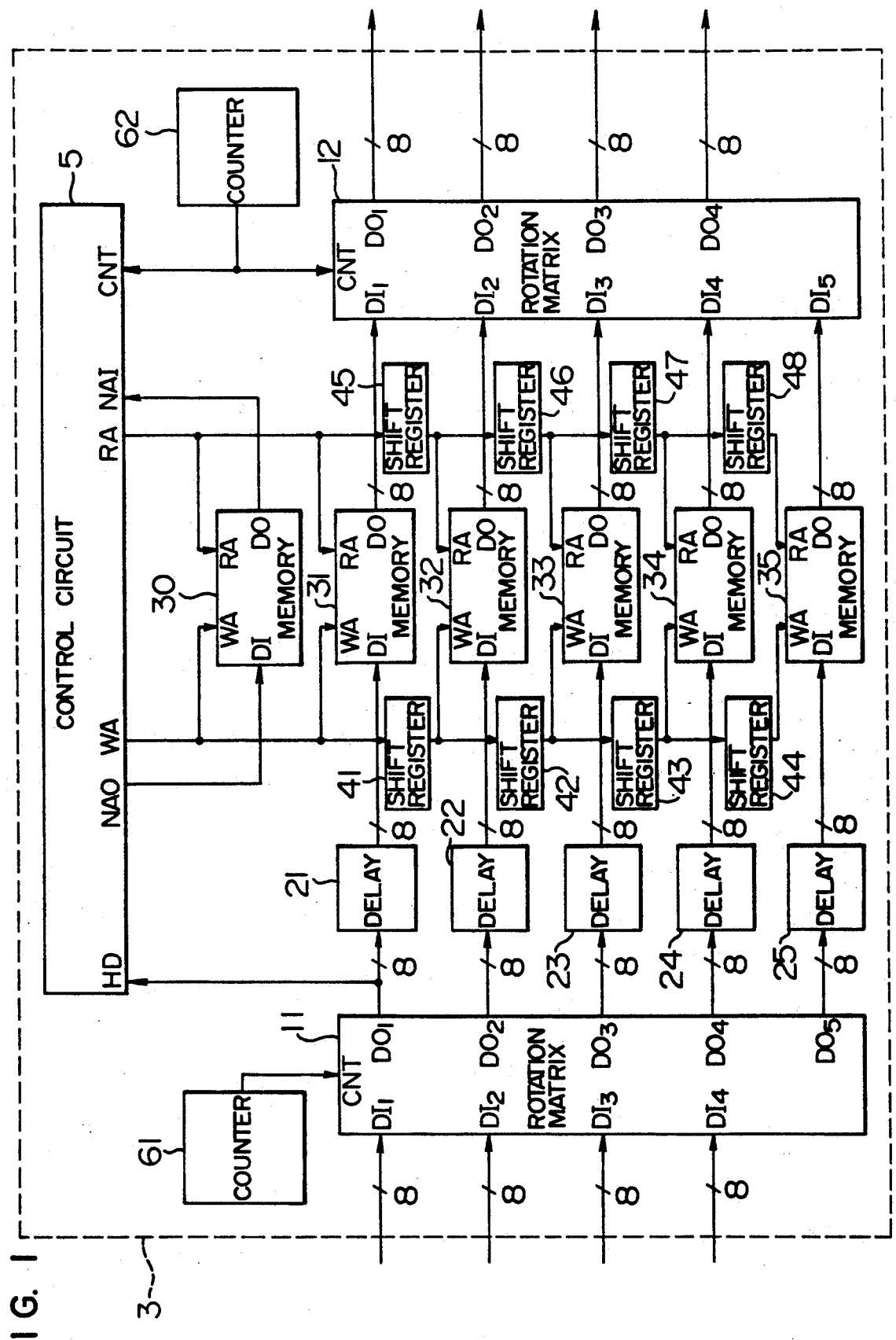
FIG. 1 is a schematic block diagram of an arrangement of a switching system according to a first embodiment of the present invention.

One example of an internal arrangement of each of the switches 3-1 to 3-n'' employed in the above-described exchanger is shown in FIG. 1. In FIG. 1, for instance, four sets of 8-parallel-lined electronic signal lines are inputted as the incoming highway into a rotation matrix 11. As a result, cells are inputted in an 8-bit parallel form into each of the incoming highways. It should be noted that a cell length of this cell is equal to, for example, 5 octets and a header length of an additive header among 5 octets is equal to, for instance, 1 octet. In the rotation matrix 11, the cells of the respective incoming highways are subdivided into data having a unit of 1 octet, the data at the first octet in which the additive header is present is outputted to a delay circuit 21, the data at the second octet is outputted to a delay circuit 22, the data at the third octet is supplied to a delay circuit 23, the data as the fourth octet is supplied to a delay circuit 24, and the data at the fifth octet is outputted to a delay circuit 25. The cell data which have passed through the delay circuits 21 to 25 are written into the corresponding memories 31 to 35. Once the cell data which have been stored into the memories 31 to 35 are read out, the cell data are outputted to the corresponding outgoing highways by a rotation matrix 12.

The additive header of the cell from an output terminal $DO_1$ of the rotation matrix 11 is inputted into an input terminal HD of a control circuit 5. In response to the content of the input additive header, write addresses WA for the memories 30 to 35 are outputted. Shift registers 41 to 44 are timing adjusting circuits such that data having 1 octet data unit of a single cell can be written into the respective memories 30 to 35 at the same address by delaying the write address.

To an input terminal CNT of the control circuit 5, an output from a counter 62 is supplied, and an address of the respective memories 31 to 35 into which the cells of the outgoing highways corresponding to the count value thereof have been stored, is outputted from an address output RA, and is supplied to an input RA of the respective memories 30 to 35. A function of shift registers 45 to 48 is to adjust the readout timing of the cell data from the respective memories 30 to 35.

It should be noted that the control circuit 5 is so arranged that an address chain is assembled every outgoing highway, and when the cell data having one address is read out from the memories 31 to 35, another address of the cell data (next address) to be subsequently read is also simultaneously read from the memory 30. A detail description will now be made of a memory control method performed by the control circuit 5 with employment of the memory 30 with reference to FIG. 5.

The connections between the inputs and outputs of the rotation matrices 11 and 12 are controlled in accordance with the count values of the corresponding counters 61 and 62.

Figure 2:
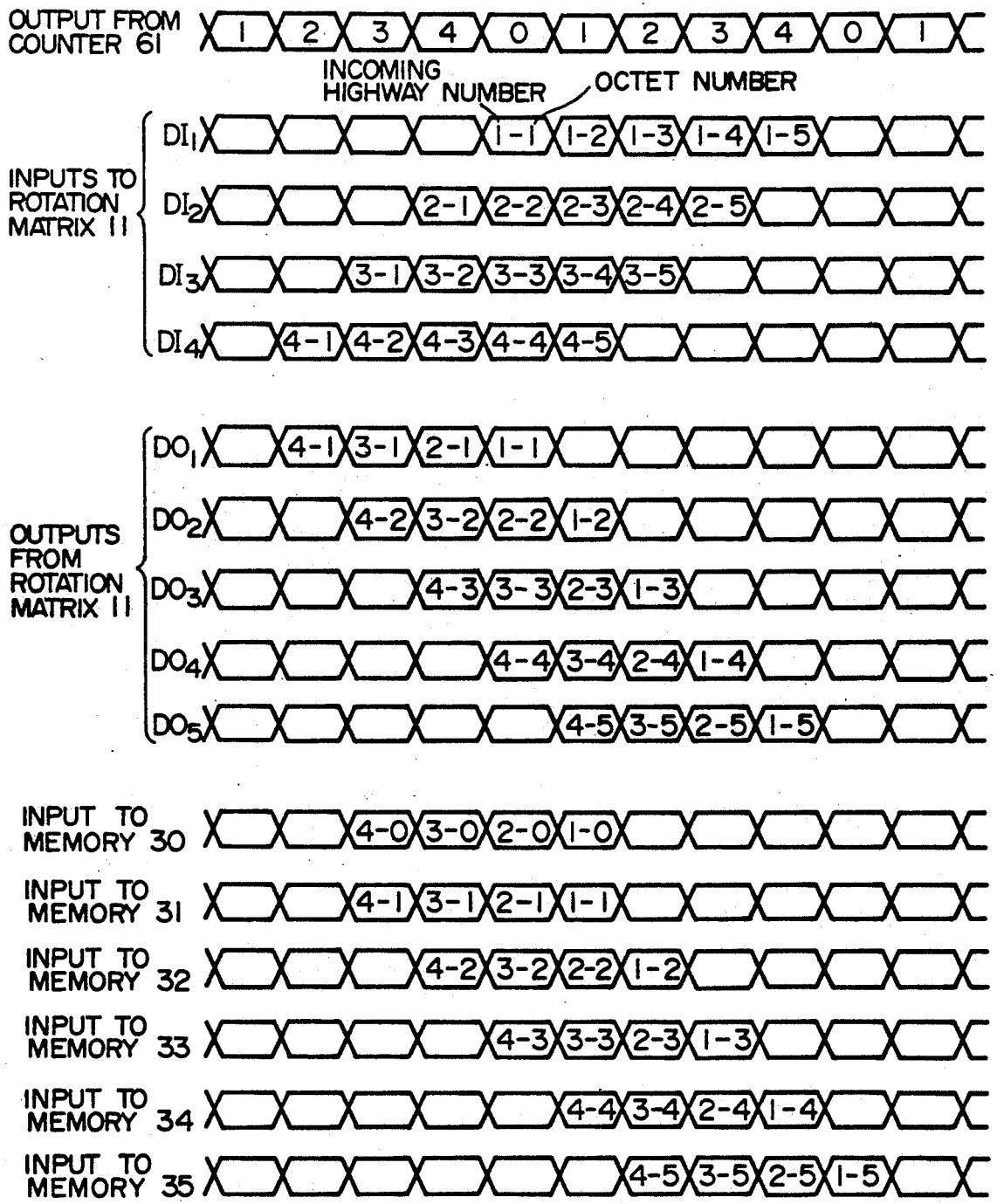
FIGS. 2 and 3 are timing charts for representing operations of various circuit portions in the switching system shown in FIG. 1.

FIG. 2 is a timing chart for representing the output from the counter 61, inputs/outputs of the rotation matrix 11, and write inputs to the memories 30 to 35. It should be noted that as to data having a 1 octet unit and indicated by "i—j" (i and j being an integer), "i" represents an incoming highway number of this inputted data whereas "j" indicates an octet number of one cell where this data is inputted into this incoming highway. The rotation matrix 11 includes input terminals $DI_1$ to $DI_4$ connected to 4 sets of these incoming highways, each set having eight incoming highways, for example. To the input terminal $DI_1$ of the rotation matrix $DI_1$, cell data at a first octet is supplied when the count value becomes zero, and also cell data at a fifth octet is inputted when the count value becomes 4. In other words, data having a single cell is inputted to this input terminal $DI_1$ while the count value is varied from zero to 4. Similarly, data having one cell is supplied to the input terminal $DI_2$ of the rotation matrix 11 while the count value is changed from 4 to 3, to the input terminal $DI_3$ thereof while the count value is varied from 3 to 2, and to the input terminal $DI_4$ while the count value is changed from 2 to 1. This is because m pieces of the logic channel number converting/additive header inserters, e.g., 2-11 to 2-1m corresponding to the respective switches 3-1 to 3-n shown in FIG. 9 are so arranged that these inserters shift to output the corresponding cells every 1 octet. In the rotation matrix 11, the input terminals and output terminals are rotary-connected with each other in response to the count values (will be discussed later). That is to say, when the count value is equal to zero, the input terminals $DI_1$, $DI_2$, $DI_3$ and $DI_4$ are directly connected to the output terminals $DO_1$, $DO_2$, $DO_3$ and $DO_4$. When the count value is 1, the input terminals $DI_1$, $DI_2$, $DI_3$ and $DI_4$ are connected to the output terminals $DO_2$, $DO_3$, $DO_4$ and $DO_5$ respectively, so that the numbers "m" of the output terminals are increased by 1 with the numbers "n" of the input terminals. It should be noted that the above-described "numbers" of the input/output terminals imply "n" and "m" indicated in $DIn$ and $DOm$. When the count value becomes 2, the input terminals $DI_1$, $DI_2$, $DI_3$ and $DI_4$ are connected to the output terminals $DO_3$, $DO_4$, $DO_5$ and $DO_1$, respectively. Further, when the count value becomes 3, the input terminals $DI_1$, $DI_2$, $DI_3$ and $DI_4$ are connected to the output terminals $DO_4$, $DO_5$, $DO_1$ and $DO_2$, respectively. Also when the count value becomes 4, the input terminals $DI_1$, $DI_2$, $DI_3$ and $DI_4$ are connected to the output terminals $DO_5$, $DO_1$, $DO_2$ and $DO_3$, respectively. That is to say, in the rotation matrix 11, each of the input terminals is connected to an output terminal having such a number defined by increasing the number of the relevant input terminal by the count value. It should be noted that when the number of the output terminal exceeds over 5, a value obtained by subtracting 5 from this exceeding number is used as the number of this output terminal.

With the above-described rotation matrix operation, the cell at the first octet from the respective input, data is outputted from the output terminal $DO_1$ of this rotation matrix 11, the cell at the second octet is outputted from the output terminal $DO_2$, the cell at the third octet is outputted from the output terminal $DO_3$, the cell at the fourth octet is outputted from the output terminal $DO_4$, and the cell at the fifth octet is outputted from the output terminal $DO_5$. Data of a single cell is outputted in such a manner that the output timings are shifted by 1 octet and data is outputted from each output terminals $DO_1$ to $DO_5$ in one octet unit. An internal arrangement of this rotation matrix 11 will be described more in detail with reference to FIG. 4.

The outputs from the rotation matrix 11 are supplied via the delay circuits 21 to 25 to the data input terminals DI of the memories 31 to 35 respectively. The delay times of the delay circuits 21 to 25 are equal to a time period after the control circuit 5 inputs the additive header of the cell at the input terminal HD until the control circuit 5 outputs the write address for the memory at the output terminal WA.

The cell at the first octet is inputted into the memory 31 and at the same time, the write address of the next cell is supplied from the terminal NAO of the control circuit 5 into the input terminal DI of the memory 30. This write address of the next cell corresponds to a write address for storing a cell which will be subsequently outputted into the memory (31 to 35) at the same outgoing highway as the outgoing highway of the next cell. This will be described more in detail with reference to FIG. 5.

When the data having 1 cell unit is written into the memories 31 to 35, the timings of the data having 1 octet capacity of a single cell is shifted by 1 octet and then written into the respective memories 31 to 35. The shift registers 41 to 44 shown in FIG. 1 each have a delay amount equal to one count timing of the counter 61, so that the timing of the same write address derived from the output WA of the control circuit 5 is successively shifted by 1 octet and thereafter supplied to the memories 31 to 35, respectively. As a result, the data having 1 octet capacity of one cell are sequentially written at the same addresses of the respective memories 31 to 35. In other words, for instance, in FIG. 2, the data 4-1 to 4-5 are successively written at the same addresses of the respective memories 31 to 35 with 1-octet-shifted timing.

Figure 3:
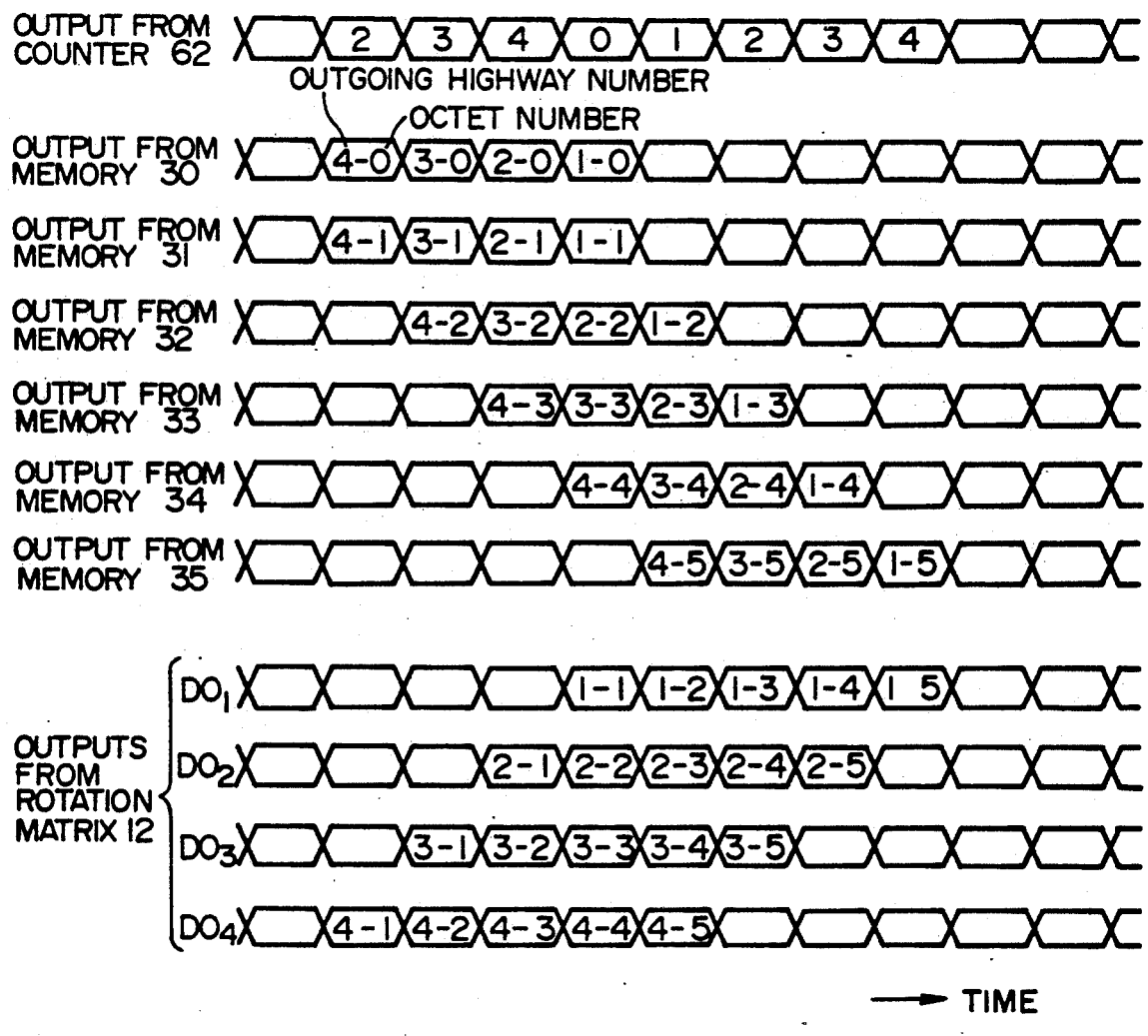

FIG. 3 is another timing chart of a count value outputted from the counter 62, readout outputs from the memories 30 to 35, and the outputs from the rotation matrix 12. In this timing chart, the data having 1 octet other than the counter output is represented by "i—j", in which "i" denotes the number of the outgoing highway from which the data should be outputted and "j" indicates that this data corresponds to which octet of a single cell outputted from this outgoing highway. The data having 1 octet of the cell of the outgoing highway number 1 is sequentially shifted by 1 octet timing and outputted from the memory 31 when the count value becomes 0, from the memory 32 when the count value becomes 1, from the memory 33 when the count value becomes 2, from the memory 34 when the count value becomes 3, and from the memory 35 when the count value becomes 4. Similarly, the data having 1 octet of the cell of other outgoing highway numbers are successively shifted by 1 octet and outputted from the memories 31 to 35. This operation is realized in such a way that the same read addresses derived from the output terminal RA of the control circuit 5 are successively delayed in the shift registers 45 to 48 every 1 count of the counter 62 and then supplied to the memories 32 to 35. As a consequence, for instance, in FIG. 3, the data 4-1 to 4-5 of the cell at the outgoing highway number 4 having the same addresses within the memories 31 to 35 are sequentially read with 1-octet-shifted timing. Then, when the count value of the counter 62 becomes 0, the read address of the cell at the outgoing highway number 1 is outputted from the control circuit 5, when the count value becomes 4, the read address of the cell at the outgoing highway number 2 is outputted therefrom; when the count value becomes 3, the read address of the cell at the outgoing highway number 3 is outputted therefrom; and when the count value becomes 2, the read address of the cell at the outgoing highway number 4 is outputted therefrom. The read address is supplied to the memory 30 at the same time as the memory 31, so that the next write address of the cell at the same outgoing highway as that of the read cell is read out and supplied as a read address of the next cell at the same outgoing highway to the terminal NAI of the control circuit 5. It should be noted that although both the counters 61 and 62 perform the counting operations at the same frequency, namely every 1 octet of the inputted cell, the timings to effect the counting operations may be mutually asynchronized with each other.

The outputs of the memories 31 to 35 are connected to the input terminals $DI_1$ to $DI_5$ of the rotation matrix 12, respectively. As shown in FIG. 3, since the rotation matrix 12 is operable under the completely same condition as that of the rotation matrix 11, the cell at the outgoing highway number 1 may be outputted at the output terminal $DO_1$, the cell at the outgoing highway number 2 may be outputted at the output terminal $DO_2$, the cell at the outgoing highway number 3 may be outputted at the output terminal $DO_3$, and the cell at the outgoing highway number 4 may be outputted at the output terminal $DO_4$.

Figure 4:
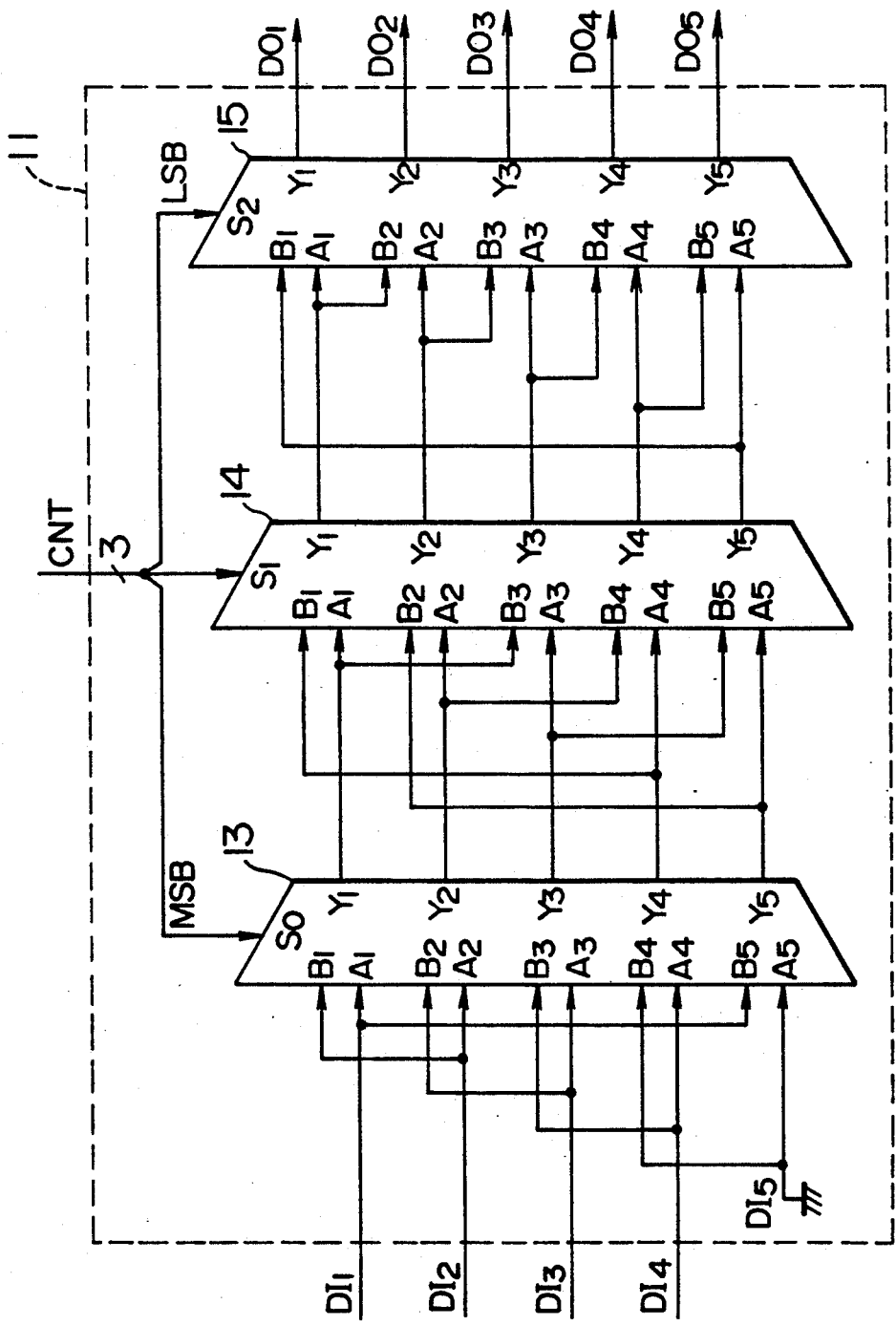
FIG. 4 is a schematic block diagram of an internal circuit of the rotation matrix 11 employed in the switching system shown in FIG. 1, according to one example.

Then, an example of an internal arrangement of the rotation matrix 11 will now be described with reference to FIG. 4. Selectors 13 to 15 connect signals at input terminals "A" to output terminals "Y" when inputs to input terminal "S" become "0", whereas connect signals at input terminals "B" to the output terminals "Y" when inputs to the input terminals "S" become "1". As a result, although the selector 15 directly outputs the inputs supplied to the input terminals $A_1$ to $A_5$ into the corresponding output number terminals $Y_1$ to $Y_5$ when the signal at the input terminal $S_2$ becomes "0", this selector 15 rotary-connects the inputs at the terminals $A_1$ to $A_5$ into the output terminals $Y_2$-$Y_5$, $Y_1$ whose output numbers are greater than those of the input numbers by 1 when the input at the input terminal $S_2$ becomes "1". The selector 14 directly outputs the inputs supplied to the terminals $A_1$ to $A_5$ when the input to the input terminal $S_1$ becomes "0", and to the contrary, rotary-connects the inputs to the input terminals $A_1$-$A_5$ to the terminals $Y_3$-$Y_5$, $Y_1$, $Y_2$ whose output numbers are greater than those of the input numbers by 2 when the input into the input terminal $S_1$ becomes "1". The selector 13 directly outputs the inputs at the terminals $A_1$-$A_5$ to the corresponding output terminals $Y_1$-$Y_5$ when the input to the input terminal $S_0$ becomes "0", however rotary-connects the inputs to the terminals $A_1$-$A_5$ into the output terminals $Y_5$, $Y_1$-$Y_4$ whose output numbers are greater than those of the input numbers by 4 when the input at the input terminal $S_0$ becomes "1". The output (e.g., 3-bit output) of the counter 61 is connected to an input terminal CNT of the rotation matrix 11. LSB of the output value is connected to the input terminal $S_2$ of the selector 15, MSB thereof is connected to the input terminal $S_0$ of the selector 13, and the remaining 1 bit is connected to the input terminal $S_0$ of the selector 14. As a result, the data supplied to the respective input terminals of the rotation matrix 11 are outputted to the output terminals whose numbers are equal to those obtained by adding the count value to the numbers of the input terminals.

It should be noted that although the rotation matrix 11 is so arranged by having 5-input and 5-output, the input terminal $DI_5$ is grounded since only 4 inputs are externally supplied thereto. Also, the rotation matrix 12 is constructed of 5-input/4-output arrangement, the input terminal $DI_5$ shown in FIG. 4 need not be grounded, and also the output from the output terminal $DO_5$ need not be outputted externally.

In the above descriptions with reference to FIGS. 1 to 4, the cell length of 5 octets was explained as to the 4-input/4-output switch. Generally speaking, in the switch utilizing the rotation matrix, the number of the inputs/outputs may be increased up to the same length as the cell length. Also, in case that the cell length is long, if the count value is varied every several octets, the input/output numbers of the switch is reduced to 1/several cell lengths (octet number). When, for instance, the cell length is equal to 72 octets, the total input/output number up to 36 may be handled if the count value is changed every 2 octets, and the total input/output number up to 18 may be handled if the count value is varied every 4 octets.

Since both the rotation matrices 11 and 12 shown in FIG. 1 employ no flip-flop, a total quantity of a hardware thereof becomes small. In case that the counter value is changed every "A" octets, a total number of flip-flops required for constructing the shift registers 41 to 48 is equal to:

(octet number of cell/A)×(write or read address length)×2.

When the shift registers 41 to 48 are removed, the data having 1 octet of a single cell are simultaneously written and read at the same addresses of the memories 31 to 35 in a parallel form. In this case, a serial-to-parallel converting multiplexer is required instead of the rotation matrix 11, and also a parallel-to-serial converting demultiplexer is needed instead of the rotation matrix 12. In these converters, a flip-flop for storing one cell every an incoming highway or outgoing highway is required, and therefore a total number of flip-flops is equal to:

(cell length (bit number))×(numbers of input/output paths)×2.

As a result, when a large-scaled switch having a great quantity of input/output paths as shown in FIG. 1 is used, the present invention allows the total amount of hardware to become relatively small. Furthermore, this switch arrangement is useful in such a case that the cell length becomes long, e.g., several tens of octets.

Figure 5:
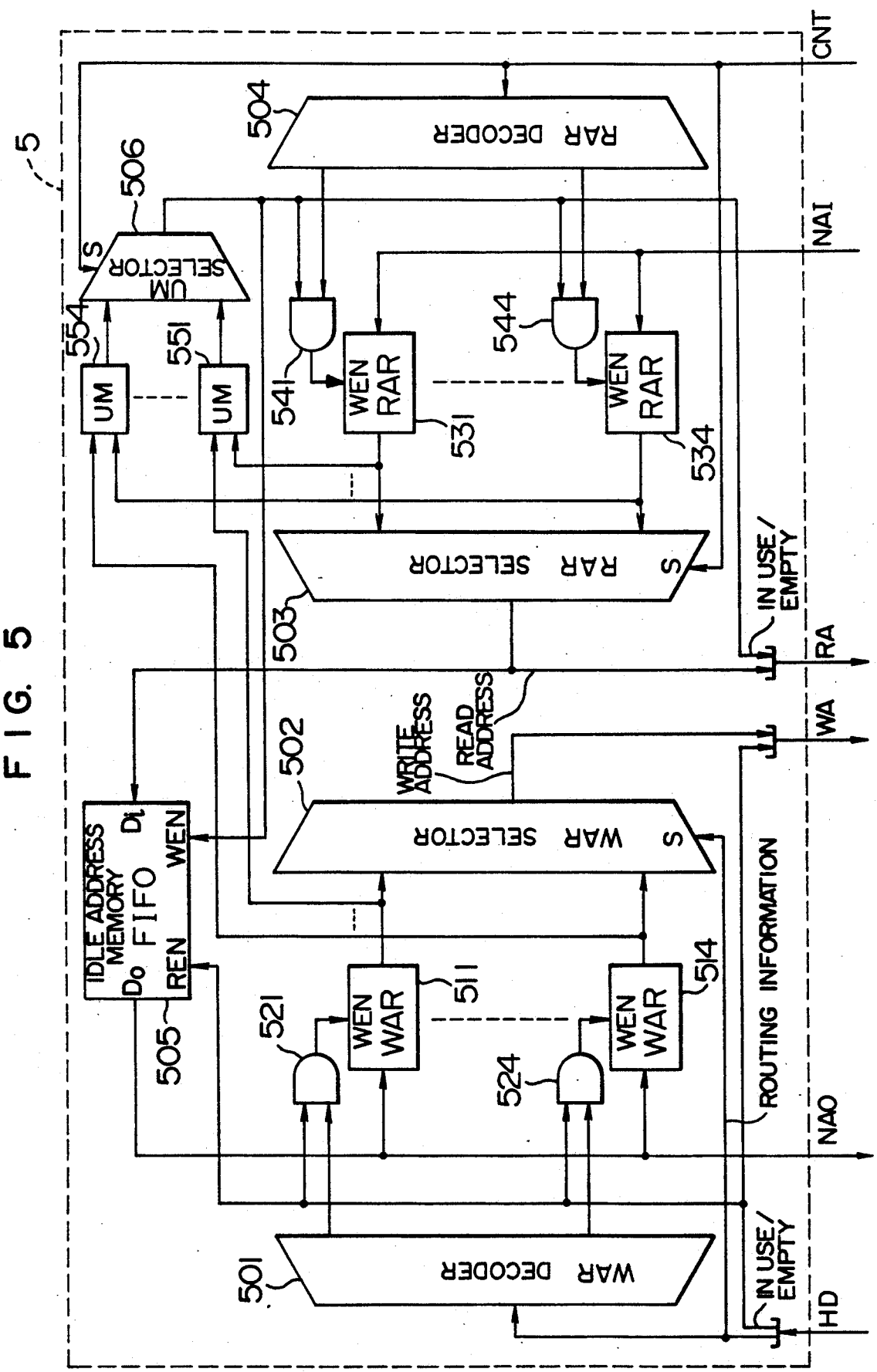
FIG. 5 is a schematic block diagram of an internal circuit of the control circuit 5 employed in the switching system shown in FIG. 1, according to one example.

Next, referring to FIG. 5, a control method for the memories 30 to 35 under the control of the control circuit 5 shown in FIG. 1 will now be explained. As previously described, an additive header is constructed of an effectiveness display field 104 and routing information 105. This effectiveness display field 104 is constructed by 1 bit. When this field represents "1", it implies "in use", whereas when this field represents "0", it implies "empty", namely there is no effective data.

In the data writing operation to the memories in FIG. 1, first of all, a selection is made by a WAR selector 502 to an output of a single register among the outputs of the write address registers (WAR) 511 to 514 (these registers contain nonuse addresses) corresponding to an outgoing highway number indicated by the routing information of the additive header inputted into the input terminal HD. Then, the selected output is outputted as a write address via a WAR selector 502, and is transferred together with the bit of the effectiveness display field, from the output terminal WA of the control circuit 5 to the memories 30 to 35. At the same time, the effectiveness display field 104 among the additive header which has been applied to the input terminal HD of the control circuit 5 is furnished to AND gates 521 to 524, the routing information 105 is decoded by a WAR decoder 501, and "1" is outputted to one of the AND gates 521 to 524 corresponding to the destination indicated by this routing information. As a consequence, one of the AND gates 521 to 524 outputs "1" to a single write enable terminal "WEN" corresponding to these write address registers WAR 511 to 514. Therefore, a nonuse address derived from an idle address memory 505 (e.g., FIFO) is written into one write address register among the registers WAR 511 to 514, which corresponds to an outgoing highway number indicated by the routing information. Also at this time, the nonuse address derived from the idle address memory 505 is transferred from the output terminal "NAO" of the control circuit 5 to the data input terminal DI of the memory 30 as a write address for a next cell of this outgoing highway number (a next address). When the effectiveness display field becomes "0", namely represents "an empty cell", the nonuse address writing operation via the AND gates 521 to 524 to the write address registers 511 to 514 is prohibited, and further this effectiveness display field is applied to the write enable terminal "REN" of the idle address memory 505 so that the output of the nonuse address from the idle address memory 505 is also prohibited. In accordance with the above-described operations, addresses used for writing the next cell every one outgoing highway are stored into the respective write address registers WAR 511 to 514, and a subsequent address is written into the memory 30. Thus, each of the next addresses stored into the registers WAR 511 to 514 is selected by the selector 502 when a next cell having a corresponding outgoing highway number appears at the switch 3, so that the selected address is applied as a write address for this cell to the write address terminals WA of the memories 30 and 31 and also to the shift register 41. Accordingly, this cell is written at this write address of the respective memories 31 to 35. Thus, the address chain is updated every time the cells appearing on the respective outgoing highways are written into the relevant memories 31 to 35. In other words, when a certain address is designated so as to read out a single cell appearing on a certain outgoing highway from the memories 31 to 35, an address of a cell appearing on the same outgoing highway which should be written at a next timing, namely an address of a cell appearing on the same outgoing highway which should be read out at a next timing (i.e., next address) can be simultaneously read out from the memory 30 based upon the designated address.

During the data reading operation from the memories, a single output of read address registers (RAR) 531 to 534, corresponding to an outgoing highway number of a cell to be read at a next timing, which is indicated by a count value of the counter 62 inputted into the input terminal "CNT" of the control circuit 5, is selected by a RAR selector 503 among outputs (read addresses) from the read address registers (RAR) 531 to 534, and is outputted as a read address from the output terminal RA of the control circuit 5 together with the effectiveness display field, and also is given to the read address terminals RA of the memories 30 and 31, and to the shift register 45. As a result, the data having one octet of the cell indicated by this address are successively read out from the memories 31 to 35. At the same time, an RAR decoder 504 outputs "1"-output into one of the AND gates 541 to 544 which corresponds to the outgoing highway number and is indicated by a count value of the counter 62, based upon this count value inputted into the input terminal CNT of the control circuit 5, and enables a read address of a cell to be writable which should be read subsequently, at the register RAR corresponding to the single AND gate. Then, this register RAR fetches the next address which has been read from the memory 30, and inputted into the input terminal "NAI" of the control circuit 5 in response to the above-described read address given by the terminal RA. With the above-described reading operations, every time a cell appearing on a certain outgoing highway is read out from the memory, an address of another cell appearing on the same outgoing highway, which should be read at a next read timing, can be stored into the corresponding registers RAR. Once the read address is outputted from the RAR selector 503, the cell having this address is read from the corresponding memories 31 to 35. Then, since this address becomes a nonuse address, this address is transferred to the idle address memory 505 so as to be stored therein, so that this stored address is again used as a write address for a cell which will be inputted into the memories 31 to 35.

Figure 11:
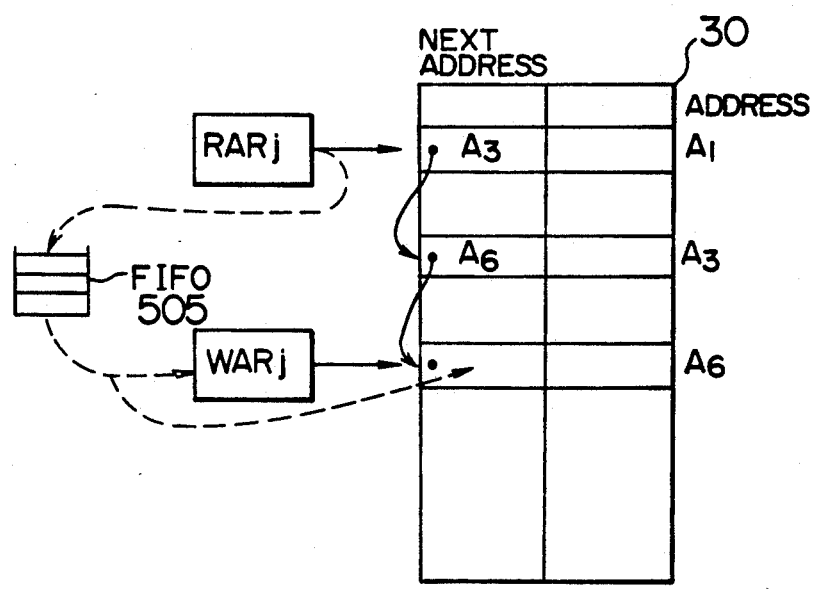
FIG. 11 illustrates a chain arrangement of a cell address.

Referring now to FIG. 11, an address chain will be described. Cells appearing on a certain outgoing highway, which have been stored into the memories 31 to 35, are buffering-supervised with assembling a single chain defined in such a manner that an address designated by a read address register RAR is a starting point, a next address which has been written at this address of the memory 30 is a next address, and an address designated by a write address register WAR of the same outgoing highway is an ending point. That is to say, as represented in FIG. 11, when addresses are sequentially written into a write address register WARj on a certain outgoing highway "j" in an order of addresses $A_1$, $A_3$, $A_6$ as the address $A_1$ being a starting point in a chain form, addresses of a read address register RARj are similarly and sequentially written in a chain form in an order of the addresses $A_1$, $A_3$, $A_6$ as the address $A_1$ being a starting point. In no cell appears at this outgoing highway "j" after the address $A_6$ has been read out from the write address register RARj, since the content of this register WARj is not updated, the content of the write address register WARj is coincident with that of the read address register RARj. Accordingly, the address $A_6$ in the address chain of the outgoing highway "j" becomes an ending point.

As previously stated, the above-described address chain implies that the addresses represent a relative relationship in a chain form.

As previously described, when a cell to be outputted to a certain outgoing highway is read out from the memories 31 to 35, the cell is read out from the memories 31 to 35 in accordance with the address of the read address register RAR for this outgoing highway, and also a next address is read out from the memory 30. The read next address is written into this read address register RAR and then this read address is transferred to the idle address memory 505 as a used idle address. On the other hand, when a cell to be outputted to a certain outgoing highway is written into the corresponding memories 31 to 35, this cell is written at an address designated by a write address register WAR of this outgoing highway. At this time, an address occurring from the idle address memory 505 is written as a next address at the same address of the memory 30 at the same time, and written into the write address register WAR. With the above-described operations the address chains are updated every outgoing highway.

As previously described, WAR of the same outgoing highway number is coincident with the address of RAR when there is no cell to be read out appearing on this outgoing highway. Conversely, no coincident is made therebetween when there exists a cell to be read. Noncoincidence detectors (UM) 551 to 554 compare addresses of a pair of the registers WAR and RAR (i.e., 511 and 531; 512 and 532; 513 and 533; 514 and 534) with each other, and outputs "0" or "1" when there exists "coincident" or "noncoincident", respectively. As a result, the output from the respective detectors UM is outputted via an UM selector 506 as the bit of the above-described effectiveness display field. The UM selector 506 selects the output of the detector UM appearing on the outgoing highway representative of the count value of the counter 62 so as to output this detector output. When no cell to be read appears on a certain outgoing highway, namely an empty state ("0" state), this effectiveness display field is supplied via the AND gates 541 to 544 to the write enable terminal "WEW" of the corresponding register RAR in order not to update a content thereof. Further, this effectiveness display field is transferred from the output terminal RA of the control circuit 5 to the memories 30 to 35 together with the read address.

FIG. 6 represents an internal arrangement of each of the memories 30 to 35. Each memory includes a 2-port random access memory (RAM) 301 and a selector 302. To an input terminal WA of this memory, both the effectiveness display field and write address are inputted. The effectiveness display field is supplied to a write enable terminal WE of the 2-port RAM 301 so as to control the write enable/disable of the data to a terminal WD of RAM 301. The write address provides an address of data to be written into a write address terminal WAD of the 2-port RAM 301. As a consequence, if the field to this terminal WE becomes "1", the data to the terminal WE is written at the write address to the terminal WAD. Both the effectiveness display field and read address are inputted into the input terminal RA of the memory. This effectiveness display field is supplied to the read enable terminal RE, whereby the read enable/disable operations for the 2-port RAM 301 are controlled. In response to the read address, the address of the data to be read to the 2-port RAM 301 is given. As a result, if the field to the terminal RE of RAM 301 becomes "1", then the data stored in RAM 301 is read in response to the read address and thus supplied from the terminal RD to the terminal B of the selector 302. Accordingly, when the effectiveness display field to the terminal RA becomes "1", the data to be supplied to the terminal B is directly outputted from the terminal Y to the output terminal DO. It should be noted that when the effectiveness display field to the input terminal RA is brought into the empty state ("0" state), the selector 302 selects the signal "0" appearing at the input terminal A so as to output therefrom this signal. As a consequence, since all of the entire cells outputted from the memories 30 to 35 become zero, the bit of the effectiveness display field becomes also zero, so that an empty cell (i.e., cell having no effective data) is outputted from the memory.

Figure 7:
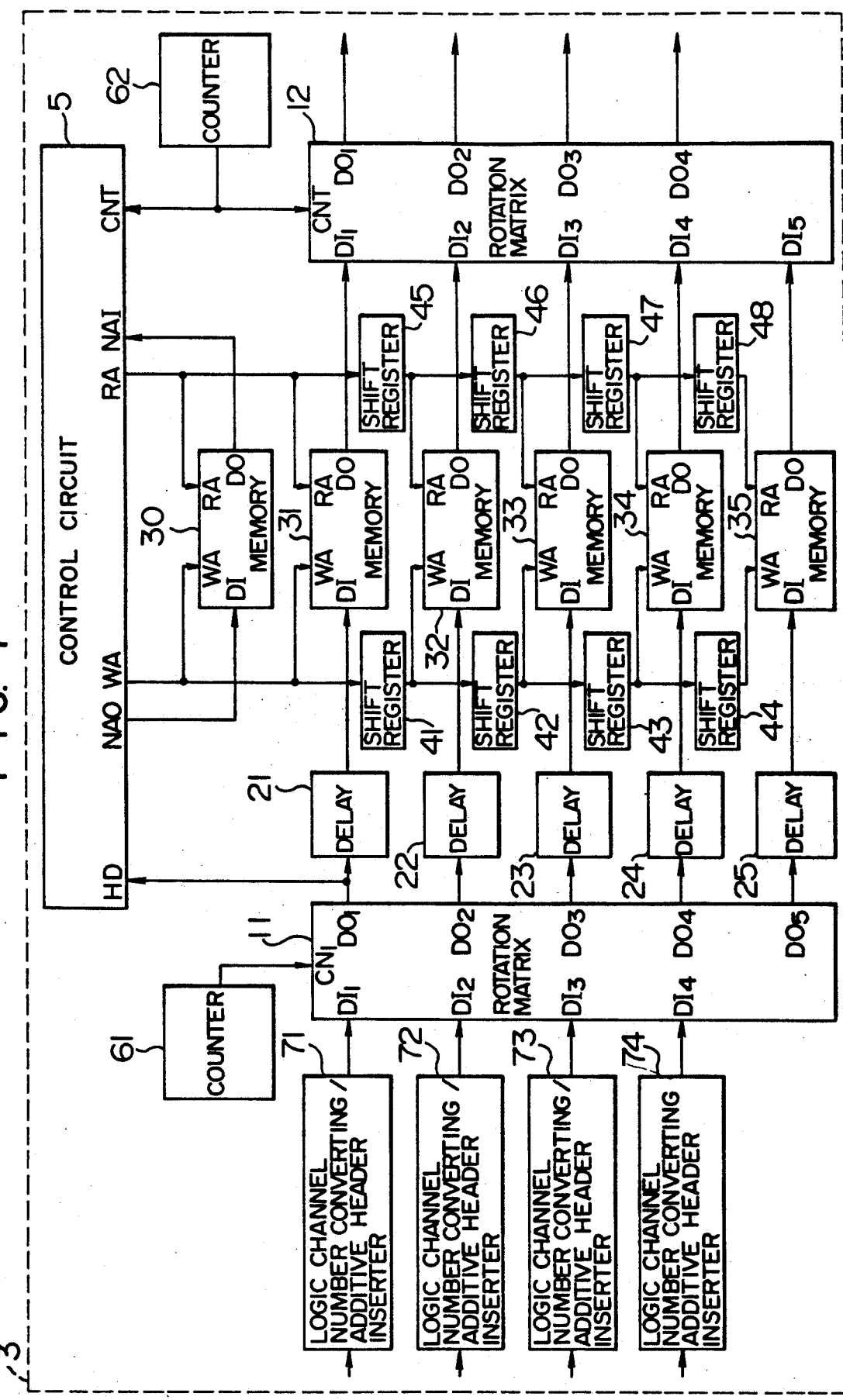
FIG. 7 is a schematic block diagram of an arrangement of a switching system according to another embodiment of the present invention.

As shown in FIG. 9, the logic channel number converting/additive header inserters 2-11 to 2-nm were employed in front of the 3-stage switches in the above-described preferred embodiment. In accordance with such an arrangement, when switches having stages other than 3 stages are employed instead of the 3-stage switches (for instance, 4-stage or 5-stage switches are employed), the additive header inserter must be changed in accordance with the arrangement of the newly employed switches. To properly use such switches having plural stages other than 3 stages without modifying the arrangements of the respective circuit portions, in the circuit arrangement, for instance, shown in FIG. 9, the logic channel number converting/additive header inserters 2-11 to 2-nm are removed and also the internal arrangement of the respective switches 3-1 to 3-n" may be so constructed that, as represented in FIG. 7, logic channel number converting/additive header inserters 71 to 74 may be provided with each incoming highway with respect to the switch shown in FIG. 1. In this case, a cell format at the inputs/outputs of the switch contains only the logic channel number 100 and data 101 shown in FIG. 10A, whereas routing information added in the logic channel number converting/additive header inserters 71 to 74 contains only information on this switch.

Figure 8:
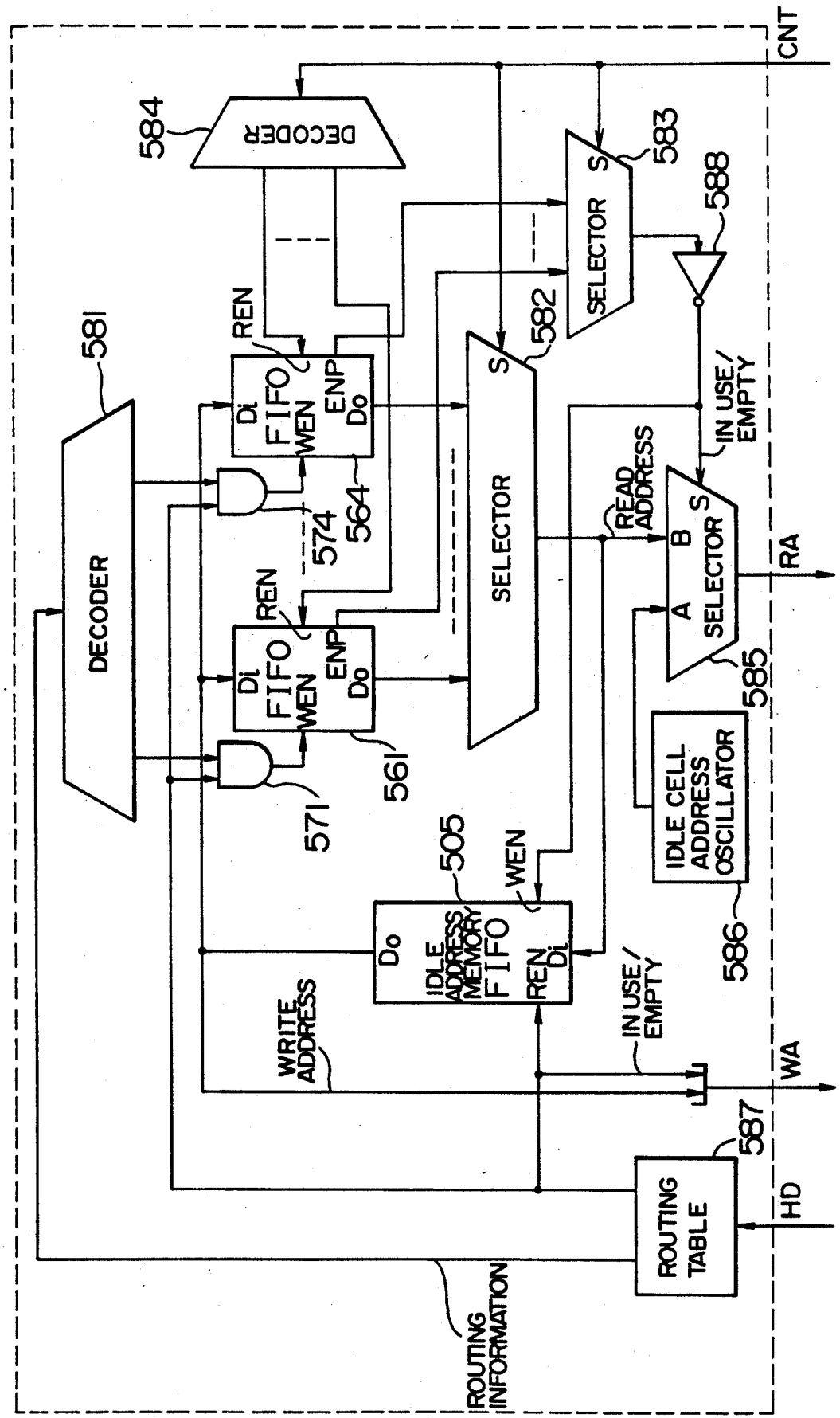
FIG. 8 is a schematic block diagram of an internal circuit of the control circuit 5 according to another example.

As another method for suitably arranging such a circuit that the arrangements of the respective portions are not modified even when the stage number of the switches is changed, for instance, the logic channel number converting/additive header inserters 2-11 to 2-nm shown in FIG. 9 are removed and a routing table shown in FIG. 8 may be employed in the control circuit 5 shown in FIG. 1. In FIG. 8, the logic channel number is inputted from O/E corresponding to the input terminal HD of the control circuit 5, and thereafter transferred to the routing table 587 from which both the effectiveness display field and routing information are derived based upon the logic channel number. There are differences in the control operations between the control circuit 5 shown in FIG. 5 and the control circuit 5 shown in FIG. 8, namely the memory control is performed based upon the direct routing information, and the memory control is effected after the routing information has been acquired from the logic channel number. Then, both the arrangement and operation of the memory control circuit 5 shown in FIG. 8 will now be described.

The routing information derived from the routing table 587 is supplied to a decoder 581. The decoder 581 decodes the routing information and outputs "1" to one of AND gates 571 to 574 corresponding to the outgoing highway indicated by the decoded routing information. The decoder 581 transfers a signal to a write enable terminal "WEN" of one of buffer memories 561 to 564 (for instance, FIFO), corresponding to the outgoing highway designated by the routing information in such a manner that the address outputted from the idle address FIFO 505 can be written. As a consequence, if a signal to an input terminal WIN of one of the FIFOs 561 and 564 becomes "1", the address derived from the idle address FIFO 505 is inputted therein as the write address. At this time, the idle address FIFO 505 is outputted as the write address together with the effectiveness display field from the output "WA" of the control circuit, and the write address is given to the memories 31 to 35. It should be noted that when the effectiveness display bit has been supplied to the AND gates 571 to 574 and also the write enable terminal "REN" of FIFO 505, which indicates an empty state, the data write operations to FIFOs 561 to 564 are prohibited via the AND gates 571 to 574, and also the address is not outputted from the idle address FIFO 505.

When the cells are read out from the memories 31 to 35, the count value of the counter 62 is inputted from the input terminal CNT, a selection is made of FIFO having the outgoing highway number corresponding to this count value among FIFOs 561 to 564, and "1" is supplied to the read enable terminal REN thereof so as to read out the address from this FIFO.

The output from the FIFO among the outputs from the FIFOs 561 to 564, which corresponds to the count value supplied to the terminal CNT, is selected by the selector 582, and the selected output (i.e., read address) is supplied via the selector 585 to the memories 31 to 35. At this time, since the read address is used to read the cell and therefore becomes a "used read address", this used read address is inputted into the idle address FIFO 505. In this control circuit, there are provided FIFOs 561 to 564 on each outgoing highway. Since the addresses of the cells are sequentially written in the order of the arrivals of these cells, a next address to be stored in the memory 30 is no longer used so that this memory 30 is not required.

When the address is outputted from the terminal ENP, "0" is derived from each of the FIFOs 561 to 564. Conversely when no address is outputted from the terminal ENP, "1" is derived from the respective FIFOs 561 to 564, and the bit of the effectiveness display field of the outgoing highway corresponding to the value of the counter 62 is outputted via the selector 583 and inverter 588. This signal is supplied to the write enable input terminal WEN of the idle address FIFO 505 so as to control the write enable/disable of the read address. When this signal indicates an empty state, a selector 585 selects an idle address inputted from an idle cell address oscillator 586 to the terminal "A" instead of the read out address to the terminal "B" and outputs the selected idle cell address therefrom. When the idle cell has been written into the idle cell address so that no cell to be read out is present in the memories 31 to 35, the idle cell designated by the idle cell address is designed to be outputted therefrom. As a consequence, the selector 302 shown in FIG. 6 for selecting the idle cell is no longer required in this control circuit.

It should be understood that although there is no such an arrangement to convert the logic channel number in the switch employing the control circuit 5 shown in FIG. 8, this logic channel number conversion may be realized as follows. That is, the converted logic channel number may be obtained from the routing table in the control circuit 5 shown in FIG. 8, and this converted logic channel number may be stored into the memory of the switch, instead of the original logic channel number.

A description will now be made to the control circuit 5 shown in FIG. 1 according to another preferred embodiment with reference to FIG. 12. In this method, the memories 31 to 35 are subdivided in a bank every outgoing highway for the supervision, which is different from the previous control methods in that the memories are commonly supervised among the outgoing highways in the control circuit 5 shown in FIGS. 5 and 8. That is to say, the cell having the outgoing highway number (routing information) 1 is stored into a first address portion of 4-equally-divided addresses of these memories 31 to 35, and the cell having the outgoing number 4 is stored in a fourth address portion thereof. On the memories divided on each outgoing highway, a first-in-first-out control is done with employment of both the write address counter (WCNT) and read address counter (RCNT). As a result, the memory 30 for performing the chain management on each outgoing highway is no longer required in this control method.

Figure 12:
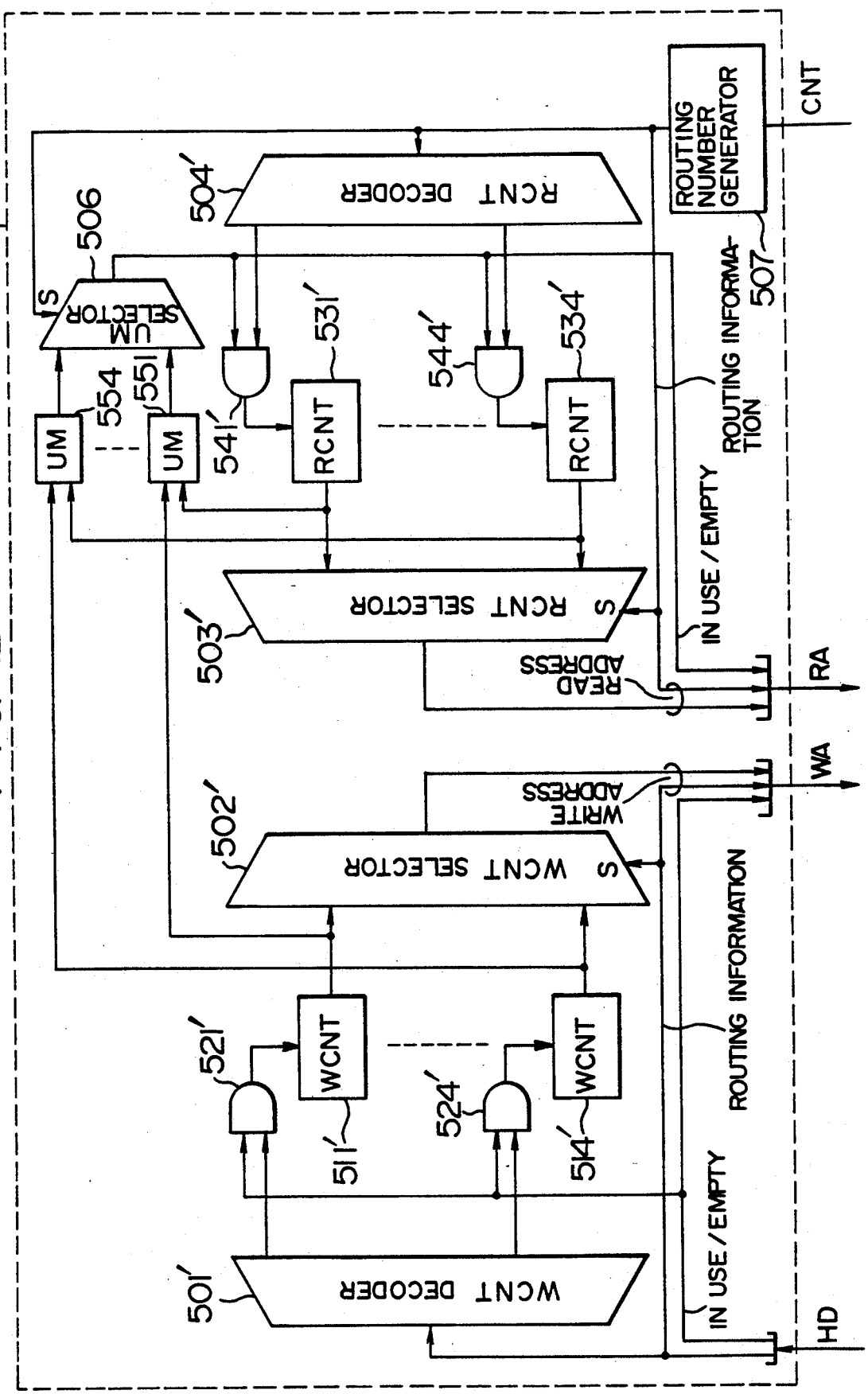
FIG. 12 is a schematic block diagram of an internal circuit of the control circuit 5 according to a further example.

In FIG. 12, the additive header of the cell shown in FIG. 10B is inputted into the input terminal HD. As previously described, the additive header is constructed by the effectiveness display field (in use/empty) and routing information. The effectiveness display field is constructed of 1 bit. When this field becomes "1", an "in use" condition is represented, whereas this field becomes "0", an "empty" condition is indicated, namely no effective data is present.

In FIG. 12, during the data writing operation to the memory, the output which has been selected by a WCNT decoder 501' in accordance with the routing information of the additive header inputted into the input terminal HD, among the outputs from write address counters (WCNT) 511' to 514', is outputted via a WCNT selector 502', and then transferred together with the routing information and effectiveness display field from the output terminal WA of the control circuit 5 to the memories 31 to 35. Both the routing information and the output from the WCNT selector become the write address. The routing information of the additive header inputted into the input terminal HD causes one of counters WCNT 511' to 514' corresponding to the outgoing highway numbers indicated by the routing information to be counted up. It should be noted that when the count value is equal to the maximum value, it becomes "0". When the effectiveness display field becomes "0" indicative of the empty condition, the data written into the counters WCNT 511' to 514' via the AND gates 521' to 524' is prohibited. In response to this operation, an address by which a cell should be subsequently written every outgoing highway, is updated in the respective counters WCNT 511' to 514'.

During the data reading operations of the memories, first of all, the routing information (outgoing highway number) corresponding to the count value of the counter 62 which has been inputted into the input terminal CNT of the control circuit 5, is generated from a routing number generator 507. That is to say, as represented in FIG. 3, when the count value of the counter 62 becomes 2, the outgoing highway number 4 is outputted; when the count value becomes 3, the outgoing highway number 3 is outputted when the count value becomes 4, the outgoing highway number 2 is outputted; and when the count value becomes 0, the outgoing highway number 1 is outputted. Among the outputs derived from read address counters (RCNT) 531' to 534', an RCNT selector 503' selects one output of the RCNT having the outgoing highway number of the cell to be subsequently read, based upon the outgoing highway number generated from a routing number generator 507. Then, the selected output of the read address counter (RCNT) is outputted together with the routing information as the read address from the output terminal RA of the control circuit 5, and the data of the cell having this read address is read out from the memories 31 to 35. At the same time, in response to the value of the outgoing highway number generated from the routing number generator 507, the RCNT decoder 504' counts up one of the counters RCNT via the AND gates 541' to 544'. It should be noted that when the count value is equal to the maximum, it becomes 0. With this operation, every time the cell is read from the memory, the address of the cell which should be read at the next reading time is updated.

It should be understood that both one write counter WCNT and one read counter RCNT having the corresponding outgoing highway numbers are coincident with each other when no cell to be read is present, and are not coincident with each other when a cell to be read is present. The noncoincidence detectors (UM) 551 to 554 outputs via an UM selector 506 the effectiveness display field indicative of "in use"/"empty" states. When there exists no cell to be read, i.e., empty state, one corresponding read counter RCNT is set not to be updated via the AND gates 541' to 544'. The display "in use"/"empty" is transferred together with the read address from the output terminal RA of the control circuit 5 to the memories 31 to 35.

In the above-described preferred embodiment, a plural-staged switch was employed. Alternatively a one-staged switch may be employed.

It should be noted that the switching system according to the present invention, namely the switch 3 may be applied not only to the exchanger shown in FIG. 9, but also to the switching system shown in U.S. patent application Ser. No. 218217 as well as the TDM switching system disclosed in JP-A-59-135994.

In accordance with the present invention, both the rotation matrices and shift registers can substitute the serial-to-parallel converting multiplexer and parallel-to-serial converting demultiplexer employed in prior art. As a result, the total number of the flip-flops employed in the conventional converters amounts to (number of input/output paths)×(cell length, or bit number)×2, whereas the circuit portions of the rotation matrices and shift registers only require the flip-flops having the total quantity of (address length) ×{(octet number of cell)−1}×2 when the rotation matrices according to the present invention change the rotation connections every 1 octet. As a result, when the cell length is long, the total amount of the hardware required in the switching system according to the present invention can be relatively decreased. When the scale of the switch becomes large, since an increase in the total number of the input/output paths becomes greater rather than an increase in the address length of the memory, the total amount of the hardware of the switching system according to the present invention relatively becomes small.

It should be noted that a single rotation matrix and the shift registers may be employed instead of one of the conventional serial-to-parallel converting multiplexer and parallel-to-serial converting demultiplexer. Furthermore, instead of the respective shift registers 41 to 48, a memory may be employed which stores the input address in response to this address and outputs the address stored therein just before.

In addition, the rotation matrices employed in the switching system according to the present invention are not limited to those shown in FIG. 6, but may be arranged by another construction. For instance, connections to a plurality of output terminals with respect to a plurality of input terminals are rotary-performed in response to data of an inputted cell. In other words, if a total number of the output terminals is "N", the number "o" of the output terminals connected to the number "i" of the input terminals is determined by adding "i" to a variable number "n". The number "o" of the output terminals is added by "n" with respect to the number "i" of the input terminals. As a result, if the number of the output terminals exceeds over the output terminal number "N", this output terminal number "N" is subtracted from this number. It should be noted that the variable number "n" corresponds to such a value which is updated by, for example, 1, every one unit of the cell inputted into this matrix.

We claim:

1. A switching system for a cell of a fixed length having plural units of data, at least one unit including a header portion and remaining units including a data portion, the cell being inputted to a first incoming highway of incoming highways, to exchange communication information between the first incoming highway and a first outgoing highway of plural outgoing highways based upon information contained in said header portion, comprising:

first switching means including a plurality of input terminals and a plurality of output terminals, a first input terminal of said input terminals being connected to the first incoming highway, for sequentially connecting each of the input terminals to each of the output terminals for every one unit of the data in the fixed length cell, and for sequentially outputting continuous data at predetermined bit positions of the plurality of output terminals to a corresponding sequence of a plurality of memory means;

each of the plurality of memory means including means for storing data from at least one of said plural output terminals of said first switching means in response to a write address, and for reading the stored data in response to a read address;

address generating means for outputting said write address and read address in response to the header portion of the cell outputted from said first switching means;

first shift means for applying the write address derived from said address generating means to said plurality of memory means while timing said first shift means application the continuous output of data of the cell such that the plural units of data of the cell appearing on the first incoming highway are written at an identical address at each of said plurality of memory means;

second switching means including a plurality of input terminals connected to each of corresponding outputs of said plurality of memory means, and a plurality of output terminals corresponding to the plural outgoing highways, for sequentially connecting each of the input terminals to each of the plurality of output terminals to output every unit of data of the cell from each of said plurality of memory means to said first outgoing highway of said plurality of outgoing highways through a first output terminal; and, second shift means for applying the read address derived from said address generating means to said plurality of memory means while timing said second shift means application with the output of the data of the cell read out from said plurality of memory means to allow output from the second switching means.

2. A switching system as claimed in claim 1, further comprising:

first timing signal generating means for generating a first timing signal for every one unit of the data in the cell of the first incoming highway; and second timing signal generating means for generating a second timing signal; wherein said first switching means includes means for sequentially connecting said first input terminal to each of the output terminals in response to said first timing signal, and means for outputting the read address in response to said second timing signal;

said address means includes means for outputting the read address in accordance with the second timing signal; and wherein said second switching means includes means for sequentially connecting each of said input terminals to each of said plurality of output terminals in response to said second timing signal.

3. A switching system as claimed in claim 2, wherein a first frequency of said first timing signal equals a second frequency of said second timing signal.

4. A switching system as claimed in claim 3, wherein said second timing signal generating means includes means for outputting said second timing signal as a read timing signal representing sequentially different outgoing highways; and, said address generating means includes:

empty address storage means for storing an empty address of an empty storage location of each of said plural memory means;

first storage means having addressable storage locations, for storing the empty address from said empty address storage means as a next address in response to the write address, and for reading the empty address therefrom as a following address in response to the read address;

first means for storing the next address from said empty address storage means in accordance with the first outgoing highway indicated by the information contained in the header portion of the cell supplied from said first switching means;

write address generating means for reading the next address from the first means corresponding to the first outgoing highway represented by the cell from said first switching means so as to furnish as the write address said next address to each of said plurality of memory means and also to said first storage means;

second means for storing the following address which has been read in response to the read address from said first storage means, in accordance with the outgoing highway of the cell read out from said memory means; and, read address generating means for reading the following address from said second means corresponding to the first outgoing highway indicated by said read timing signal in response to said read timing signal so as to supply said following address as the read address to both the first storage means and each of said memory means.

5. A switching system as claimed in claim 4, further comprising:

means for supplying the read address from said read address generating means to said empty address storage means as the empty address.

6. A switching system as claimed in claim 1, wherein output terminal numbers of said first switching means, input terminal numbers of said second switching means and numbers of said memory means are equal to the unit numbers of said cell, respectively.

7. A switching system as claimed in claim 1, wherein said address generating means includes:

address memory means provided on each outgoing highway, for storing the address from said memory means in an order of reading the cells;

empty address memory means for storing an empty address which is not used in said memory means;

write address generating means for outputting the write address from said empty address memory means in response to the cell from said first switching means, and simultaneously for inputting said write address into one of said address means corresponding to the outgoing highway of said cell; and, read address generating means for outputting the read address from one of said address memory means corresponding to the outgoing highway of the cell to be read, and simultaneously for inputting said read address to said empty address memory means.

8. A switching system as claimed in claim 1, further comprising:

means employed at an input side of said first switching means in accordance with each of the incoming highways, for adding to said header portion information representative of the outgoing highways corresponding to said cell from a logic channel number of said header portion of the cell appearing on the incoming highways.

9. A switching system as claimed in claim 1, wherein said address generating means further includes:

third means for detecting that no cell to be read subsequently appears on a certain outgoing highway so as to output a detection signal; and, fourth means for outputting an empty cell having no effective information, instead of such an operation that an output is derived from one of said memory means corresponding to said outgoing highway in response to said detection signal from said third means.

10. A switching system as claimed in claim 1, wherein said address generating means further comprising:

fifth means for detecting that no cell to be subsequently read appears on a certain outgoing highway so as to output a detection signal; and, sixth means for outputting an empty cell address as the read address in response to the detection signal from said third means.

11. A switching system for a cell of a fixed length having plural units of data, at least one unit including a header portion and remaining units including a data portion, the cell being inputted to a first incoming highway of incoming highways, to exchange communication information between the first incoming highway and a first outgoing highway of plural outgoing highways based upon information contained in said header portion, comprising:

first switching means including a plurality of input terminals and a plurality of output terminals, a first input terminal of said input terminals being connected to the first incoming highway, for sequentially connecting each of the input terminals to each of the output terminals for every one unit of the data in the fixed length cell, and for continuously outputting data at predetermined bit positions of the plurality of output terminals;

a plurality of memory means for storing data from said plural output terminals of said first switching means in response to a write address, and for reading the stored data in response to a read address;

address generating means for outputting said write address and read address in response to the header portion of the cell outputted from said first switching means;

shift means for applying the write address derived from said address generating means to said plurality of memory means while timing said first shift means application of the continuous output of data of the cell such that the plural units of data of the cell appearing on the first incoming highway are written at an identical address at each of said plurality of memory means;

second switching means including a plurality of input terminals connected to each of corresponding outputs of said plurality of memory means, and a plurality of output terminals corresponding to the plural outgoing highways, for sequentially connecting each of the input terminals to each of the plurality of output terminals to output every unit of data of the cell from each of said plurality of memory means to said first outgoing highway of said plurality of outgoing highways through a first output terminals.

12. An m-input and n-output switching system for a cell of a fixed length in a k unit having a header portion and a data portion, (m, n, k each being integer), the cell inputted to each of incoming highways, to exchange communication information between m incoming highways ($m \leq k$) and n outgoing highways ($n \leq k$) based upon information contained in said header portion, comprising:

first counter means for counting a first count value from "0" to $(k-1)$, wherein k is a number of memories, at a predetermined first timing, and for returning the first count value to "0" in case of $(k-1)$ and further for repeating the first counting operation;

a first rotation matrix having m input terminals connected to said m incoming highways and k output terminals, for outputting data on a cell of a i-th ("i" being an integer, $0 \leq i \leq (m-1)$) incoming highway to an $(i+j)$-th output terminal when a value j ("j" being an integer, $0 \leq j \leq (k-1)$ of said first counter means is in a range of $(i+j) \leq (k-1)$, and to a $(i+j-k)$-th output terminal when a value j is in the range of $(i+j) \geq k$;

second counter means for counting up a second count value from "0" to (k−1) at a predetermined second timing, and for returning the second count value to "0" in case of (k−1), and also for repeating such a second counter operation;

a second rotation matrix having k input terminals and output terminals connected to each of said "n" outgoing highways, for outputting cell data in an i-th ($0 \leq i \leq (k-1)$) input terminal to (i−p)-th output terminal when a value p ("p" being an integer, $0 \leq p \leq (k-1)$) of said second counter means is in a range of a value p is (i+p)$\geq$0, and to an (i−p+k)-th output terminal when in a range of (i−p)<0;

"k" memory means whose inputs are connected to said k output terminals of the first rotation matrix and whose output are connected to said k input terminals of said second rotation matrix;

memory control means for inputting information of the header portion among the data outputted from said first rotation matrix, for outputting a write address to a first memory means in response to said information, and for outputting the read address to the first memory means in response to the count value of said second counter means;

(k−1) of first shift registers for inputting the write address therein which is inputted into a write address input of said (i−1)-th memory means, and for outputting the write address to a write address input of the i-th memory means; and, (k−1) second shift registers for inputting the read address therein which is inputted into a read address input of said (i−1)-th memory means, and for outputting the read address to a read address input of the i-th memory means.

13. A switching system as claimed in claim 12, wherein said memory control means includes:
(n) first register means connected to the outgoing highways in an one-to-one corresponding relationship;
(n) second register means connected to the outgoing highways in an one-to-one corresponding relationship;
empty address memory means for storing an empty address which is not used by said memory means;
next address memory means for storing a next address to be subsequently read out from said memory means;
write address generating means for writing the empty address from said empty address memory means in one of the first register means corresponding to a selected outgoing highway in response to the information of the header portion derived from said first switching means, and for outputting the previously stored empty address as the write address, and further for supplying the outputted write address to the next address memory means to store the empty address from said empty address memory means into said next address memory means; and,
read address generating means for reading the next address stored in said second register means corresponding to the selected outgoing highway indicated by the count value of said second counter means, as the read address, in response to said count value, and also for supplying the read address to said next address memory means to read out the next address which is then stored into one of said second register means.

14. A switching system as claimed in claim 12, wherein said memory control means includes:
a plurality of address memory means provided on each outgoing highway, for storing the address from said memory means in an order of reading the cells;
empty address memory means for storing an empty address which is not used in said memory means;
write address generating means for outputting the write address from said empty address memory means in response to the cell from said first switching means, and simultaneously for inputting said write address into one of said address means corresponding to the outgoing highway of said cell; and,
read address generating means for outputting the read address from one of said address memory means corresponding to the outgoing highway of the cell to be read, and simultaneously for inputting said read address to said empty address memory means.

15. A switching system as claimed in claim 14, wherein said read address generating means includes means for outputting the read address from one of said plurality of address memory means which corresponds to the value of said second counter means.

16. A switching system as claimed in claim 12, further comprising:
means employed at an input side of said first switching matrix in accordance with each of the incoming highways, for adding to said header portion, information representative of the outgoing highways corresponding to said cell from a logic channel number of said header portion of the cell appearing on the incoming highways.

17. A switching system as claimed in claim 12, wherein said memory control means further includes:
third means for detecting that no cell to be read subsequently appears on a certain outgoing highway so as to output a detection signal; and,
fourth means for outputting an empty cell having no effective information, instead of such a operation that an output is derived from one of said memory means corresponding to said outgoing highway in response to said detection signal from said third means.

18. A switching system as claimed in claim 12, wherein said memory control means further comprising:
fifth means for detecting that no cell to be subsequently read appears on a certain outgoing highway so as to output a detection signal; and,
sixth means for outputting an empty cell address as the read address in response to the detection signal from said third means.

19. A switching system for employing a cell of a fixed length having plural units of data, at least one unit including a header portion and remaining units including a data portion, which is inputted to each of incoming highways, so as to exchange communication information between plural incoming highways and plural outgoing highways based upon information contained in said header portion, comprising:
first switching means including a plurality of input terminals and a plurality of output terminals, said input terminals being connected to the corresponding incoming highways, for sequentially connecting each of the input terminals to one of different output terminals for every one unit of data in the input cell, and for continuously outputting the data units at bit positions corresponding data position of respective incoming highways from the respective output terminals;

a plurality of memory means for storing the data from said plural output terminals of said first switching means in response to a write address, and for reading the stored data in response to a read address;

storage means for storing an empty address of an empty storage location of said plurality of memory means;

address generating means for generating said write address and read address in accordance with the empty address in said storage means;

first shift means for applying the write address derived from said address generating means to said plurality of memory means while timing the application of the write address to said plurality of memory means are for each one unit of the data of the cell such that the respective data each having 1 unit on the cell appearing on an incoming highway is written at the same address of said plurality of memory means;

second switching means including both a plurality of input terminals connected to each of corresponding outputs of said memory means, and a plurality of output terminals corresponding to the respective outgoing highways, for sequentially connecting each of the input terminals to each of the different output terminals for every unit on the cell outputted from said memory means; and for outputting the data of the cell on the corresponding outgoing highways to the respective output terminals; and, second shift means for applying the read address derived from said address generating means to said plurality of memory means while timing application of the read address to said plurality of memory means are for every one unit of data respectively such that the data on the cells read out from said plurality of memory means are outputted from the second switching means as data on cells appearing in the respective outgoing highways.

20. The switching system according to claim 19, wherein said address generating means includes first means for storing in first memory means an empty address from said storage means as a next address along with a cell received from said first switching means, and means for storing said empty address for use as a write address to store the next cell received from said first switching means for a given outgoing highway in said first memory means.

21. The switching system according to claim 20, wherein said address generating means further includes second means for storing a next address read out of said first memory means at the time a cell is read out of said plurality of memory means for a given outgoing highway.

* * * * *

UNITED STATES PATENT AND TRADEMARK OFFICE
CERTIFICATE OF CORRECTION

PATENT NO. : 5,184,346
DATED : February 2, 1993
INVENTOR(S) : Takahiko Kozaki, et al.

It is certified that error appears in the above-identified patent and that said Letters Patent is hereby corrected as shown below:

Claim 11, column 22, line 29, delete "first".

Claim 11, column 22, line 45, delete "terminals" and substitute therefor --terminal--.

Claim 12, column 22, line 48, delete the "," after "portion"; and, before "integer" insert --an--.

Claim 12, column 23, line 12, delete "$(i+p) \geq 0$" and substitute therefor --$(i-p) \geq 0$--.

Claim 17, column 24, line 42, before "operation" delete "a" and substitute therefor --an--.

Signed and Sealed this

Twenty-eighth Day of December, 1993

Attest:

BRUCE LEHMAN

*Attesting Officer*     *Commissioner of Patents and Trademarks*